(12) United States Patent
Amano et al.

(10) Patent No.: US 8,990,773 B2
(45) Date of Patent: Mar. 24, 2015

(54) RETRIEVING REVISIONS IN SOURCE CODE FROM A PLURALITY OF REVISION HISTORY DATA SETS

(71) Applicant: International Business Machines Corporation, Armonk, NY (US)

(72) Inventors: Takehiko Amano, Kanagawa (JP); Susumu Fukuda, Kanagawa (JP); Kenya Ishimoto, Machida (JP); Ken Kumagai, Edogawa-ku (JP); Mayumi Goto, Ayase (JP); Atsushi Yokoi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/716,574

(22) Filed: Dec. 17, 2012

(65) Prior Publication Data
US 2013/0167120 A1    Jun. 27, 2013

(30) Foreign Application Priority Data

Dec. 21, 2011   (JP) .................................. 2011-279350

(51) Int. Cl.
G06F 9/44         (2006.01)

(52) U.S. Cl.
CPC ........................................ G06F 8/71 (2013.01)
USPC ......................................................... 717/122

(58) Field of Classification Search
None
See application file for complete search history.

(56) References Cited

U.S. PATENT DOCUMENTS

| | | | |
|---|---|---|---|
| 7,076,496 B1* | 7/2006 | Ruizandrade | 717/170 |
| 7,478,435 B2* | 1/2009 | Sueyoshi et al. | 726/27 |
| 8,135,673 B2* | 3/2012 | Thomas | 707/638 |
| 8,312,415 B2* | 11/2012 | Marius et al. | 717/101 |
| 8,312,447 B2* | 11/2012 | Callaghan et al. | 717/175 |
| 8,438,558 B1* | 5/2013 | Adams | 717/170 |
| 8,448,141 B2* | 5/2013 | Blount et al. | 717/125 |
| 2004/0003034 A1* | 1/2004 | Sun et al. | 709/203 |
| 2005/0022157 A1* | 1/2005 | Brendle et al. | 717/104 |
| 2007/0143752 A1* | 6/2007 | Clemm et al. | 717/178 |
| 2007/0256054 A1* | 11/2007 | Byrne et al. | 717/113 |
| 2007/0283321 A1* | 12/2007 | Hegde et al. | 717/110 |
| 2008/0133618 A1* | 6/2008 | Kawabe et al. | 707/203 |
| 2008/0196011 A1* | 8/2008 | Bhandari et al. | 717/123 |
| 2008/0263504 A1* | 10/2008 | Marius et al. | 717/100 |
| 2009/0044178 A1* | 2/2009 | Aridor et al. | 717/143 |
| 2009/0293043 A1* | 11/2009 | Begel et al. | 717/122 |
| 2010/0125839 A1* | 5/2010 | Gebis et al. | 717/170 |
| 2010/0269096 A1* | 10/2010 | Araya et al. | 717/113 |
| 2011/0283270 A1* | 11/2011 | Gass et al. | 717/168 |
| 2013/0080997 A1* | 3/2013 | Dattathreya | 717/121 |

FOREIGN PATENT DOCUMENTS

| | | |
|---|---|---|
| JP | 2005108437 A | 4/1993 |
| JP | 11-143755 A | 5/1999 |

(Continued)

*Primary Examiner* — Don Wong
*Assistant Examiner* — Daxin Wu
(74) *Attorney, Agent, or Firm* — Cantor Colburn LLP; Jeanine Ray-Yartletts

(57) ABSTRACT

Embodiments includes techniques for retrieving revisions in source code from a plurality of revision history data sets including link information to the source code and version information. The revision history data includes a function unit specified by a user is extracted from the plurality of revision history data sets, and a list of the extracted revision history data is displayed on the display device. Also, the display of this list includes displaying on the display device or creating in a storage area source code or information associated with the source code corresponding to at least two different revision history data sets in this first list.

17 Claims, 24 Drawing Sheets

(56) References Cited

FOREIGN PATENT DOCUMENTS

| | | |
|---|---|---|
| JP | 2000194466 A | 7/2000 |
| JP | 2002-366354 A | 12/2002 |
| JP | 2006185211 A | 7/2006 |
| JP | 2006277435 A | 10/2006 |
| JP | 2011-175446 A | 9/2011 |
| JP | 2011175446 A * | 9/2011 |
| WO | 2009-011056 A1 | 1/2009 |

* cited by examiner

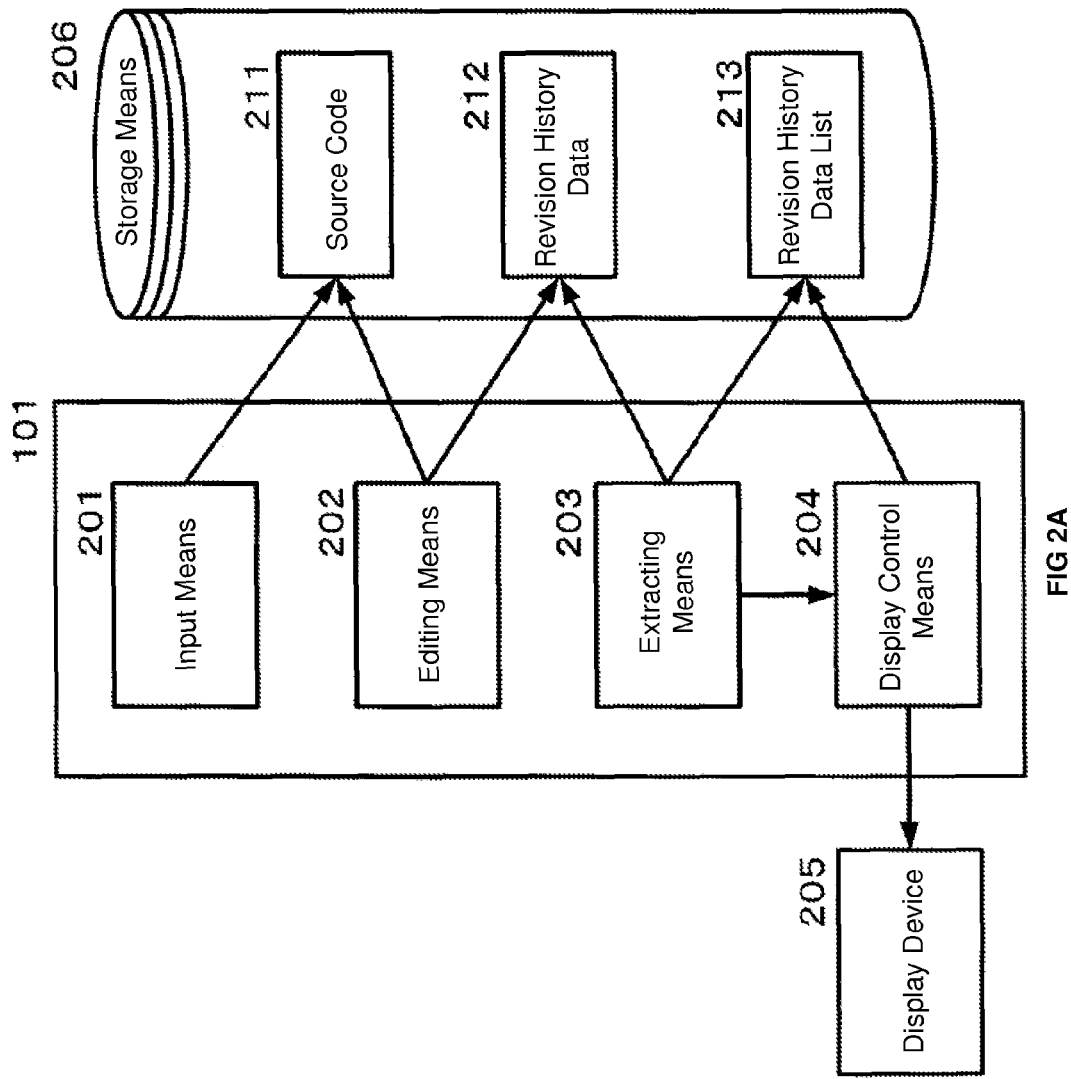

FIG 2B

Revision History Data List Showing All Revision
History Data Before Extraction

301

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foo" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | |

A1. Revision History Data List After Extraction Using "foo"

a. Clear Out                                                                                           311

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foo" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | | b. Match-Only Display                                                                                  312

| Version | Revision Comment | Revision Date | Reviser |
|---|---|---|---|
| 24 | error handling added | 2011/9/23 | D |
| 19 | bug fix | 2011/8/9 | C |
| 17 | UI fix | 2011/8/4 | C |
| 15 | (no comment) | 2011/7/21 | B |
| 14 | response to customer | 2011/7/21 | C |

FIG. 3C

A2. Revision History Data List After Extraction Using "foo"
(Division Condition: Version 16 and Later)

a. Clear Out                                                              321

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foo" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | | b. Match-Only Display                                                    322

| Version | Revision Comment | Revision Date | Reviser |
|---|---|---|---|
| 24 | error handling added | 2011/9/23 | D |
| 19 | bug fix | 2011/8/9 | C |
| 17 | UI fix | 2011/8/4 | C |

FIG. 3D

B. Revision History Data List After Extraction Using "foo", "baz" Added Using "and"

a. Clear Out                                                                 331

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foo" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | | b. Match-Only Display                                        332

| Version | Revision Comment | Revision Date | Reviser |
|---|---|---|---|
| 19 | bug fix | 2011/8/9 | C |
| 15 | (no comment) | 2011/7/21 | B |
| 14 | response to customer | 2011/7/21 | C |

FIG. 3E

C1. Revision History Data List After Extraction Using "foo", "baz" Added Using "or"

a. Clear Out                                                                 |341

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foo" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | | b. Match-Only Display                                      342

| Version | Revision Comment | Revision Date | Reviser |
|---|---|---|---|
| 24 | error handling added | 2011/9/23 | D |
| 21 | bug fix | 2011/9/12 | D |
| 19 | bug fix | 2011/8/9 | C |
| 17 | UI fix | 2011/8/4 | C |
| 15 | (no comment) | 2011/7/21 | B |
| 14 | response to customer | 2011/7/21 | C |
| 12 | bug fix | 2011/6/10 | A |
| 7 | ver1.0 | 2011/5/10 | B |

FIG. 3F

C2. Revision History Data List After Extraction Using "foo", "baz" Added Using "or"

a. Clear Out                                                                 351

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foo" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | | b. Match-Only Display                                                        352

| Version | Revision Comment | Revision Date | Reviser |
|---|---|---|---|
| 24 | error handling added | 2011/9/23 | D |
| 21 | bug fix | 2011/9/12 | D |
| 19 | bug fix | 2011/8/9 | C |
| 17 | UI fix | 2011/8/4 | C |
| 15 | (no comment) | 2011/7/21 | B |
| 14 | response to customer | 2011/7/21 | C |

FIG. 3G
D. Revision History Data List After Extraction Using "foo" as Alias for "foo"

a. Clear Out  361

| Version | Revision Comment | Revision Date | Reviser | (Supplement) |
|---|---|---|---|---|
| 26 | bug fix | 2011/9/29 | B | |
| 25 | wording added | 2011/9/23 | D | |
| 24 | error handling added | 2011/9/23 | D | "foo" included in revision |
| 23 | input method added | 2011/9/19 | D | |
| 22 | bug fix | 2011/9/13 | D | |
| 21 | bug fix | 2011/9/12 | D | "baz" included in revision |
| 20 | function added | 2011/9/10 | D | |
| 19 | bug fix | 2011/8/9 | C | "foo" and "baz" included in revision |
| 18 | wording added by user | 2011/8/4 | C | |
| 17 | UI fix | 2011/8/4 | C | "foo" included in revision |
| 16 | UI added | 2011/8/2 | C | |
| 15 | (no comment) | 2011/7/21 | B | "foo" and "baz" included in revision |
| 14 | response to customer | 2011/7/21 | C | "foo" and "baz" included in revision |
| 13 | function added | 2011/6/17 | C | "foo" included in revision |
| 12 | bug fix | 2011/6/10 | A | "baz" included in revision |
| 11 | bug fix | 2011/6/10 | A | |
| 10 | bug fix | 2011/6/10 | A | |
| 9 | bug fix | 2011/5/30 | B | |
| 8 | bug fix | 2011/5/15 | B | |
| 7 | ver1.0 | 2011/5/10 | B | "foobar" and "baz" included in revision |
| 6 | UI added | 2011/5/2 | B | "foo" included in revision |
| 5 | wording added | 2011/4/22 | A | "foo" included in revision |
| 4 | externalize | 2011/4/19 | A | |
| 3 | ver0.8 | 2011/4/15 | A | "foo" included in revision |
| 2 | ver0.3 | 2011/3/29 | A | |
| 1 | initial version | 2011/3/16 | A | | b. Match-Only Display  362

| Version | Revision Comment | Revision Date | Reviser |
|---|---|---|---|
| 24 | error handling added | 2011/9/23 | D |
| 19 | bug fix | 2011/8/9 | C |
| 17 | UI fix | 2011/8/4 | C |
| 15 | (no comment) | 2011/7/21 | B |
| 14 | response to customer | 2011/7/21 | C |
| 13 | function added | 2011/6/17 | C |
| 7 | ver1.0 | 2011/5/10 | B |
| 6 | UI added | 2011/5/2 | B |
| 5 | wording added | 2011/4/22 | A |
| 3 | ver0.8 | 2011/4/15 | A |

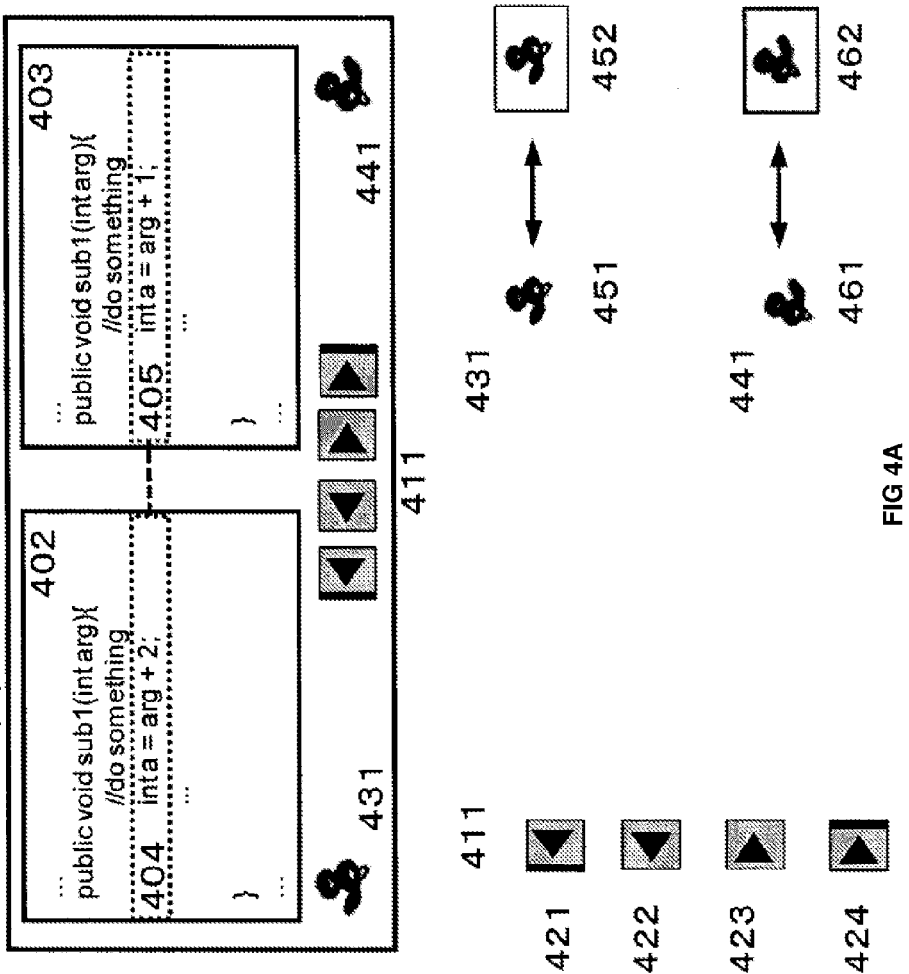

FIG. 5A
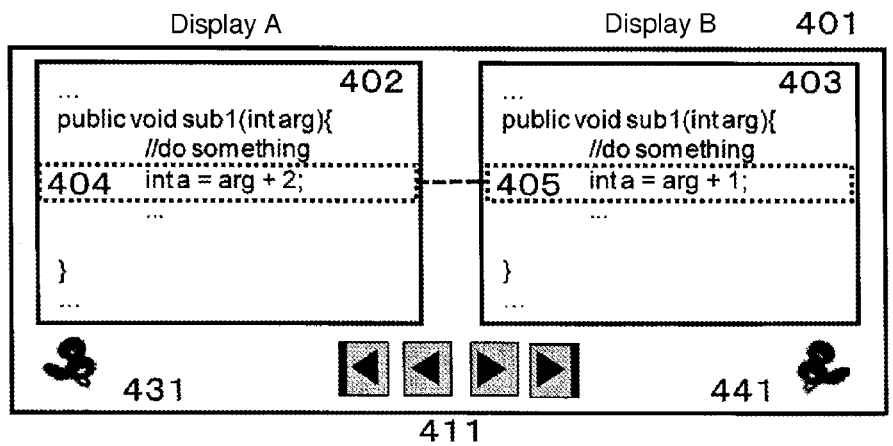
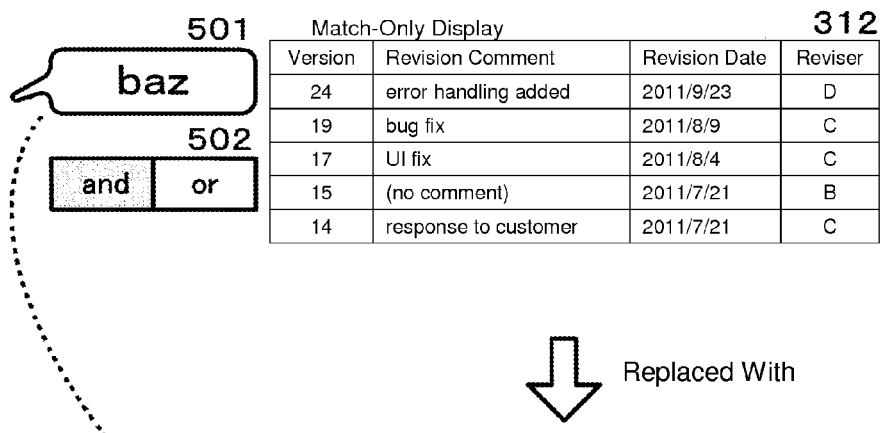

FIG. 5B
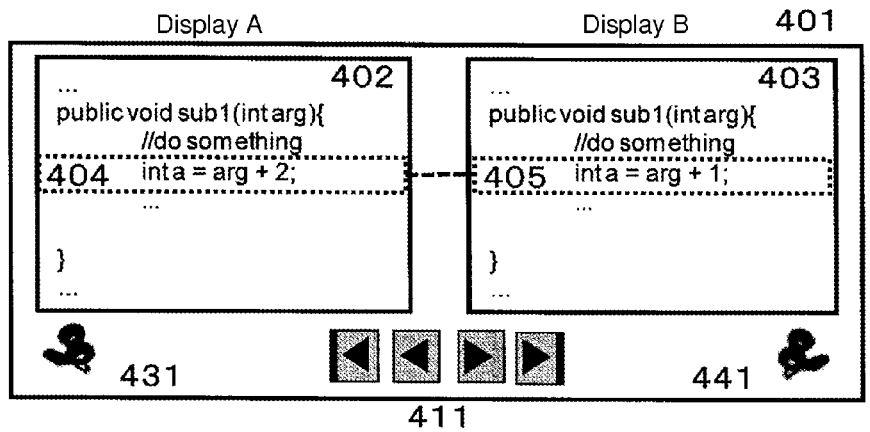
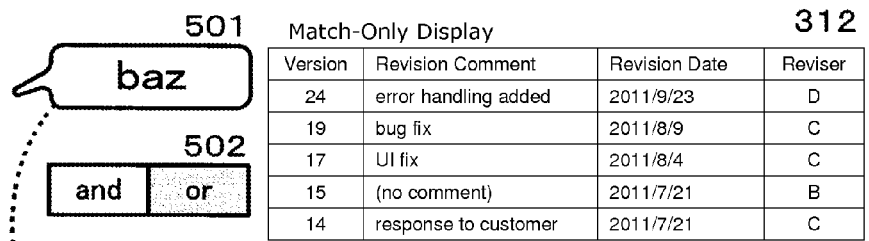
| Match-Only Display | | | | 312 |
| --- | --- | --- | --- | --- |
| Version | Revision Comment | Revision Date | Reviser | |
| 24 | error handling added | 2011/9/23 | D | |
| 19 | bug fix | 2011/8/9 | C | |
| 17 | UI fix | 2011/8/4 | C | |
| 15 | (no comment) | 2011/7/21 | B | |
| 14 | response to customer | 2011/7/21 | C | |
⇩ Replaced With
| Match-Only Display | | | | 342 |
| --- | --- | --- | --- | --- |
| Version | Revision Comment | Revision Date | Reviser | |
| 24 | error handling added | 2011/9/23 | D | |
| 21 | bug fix | 2011/9/12 | D | |
| 19 | bug fix | 2011/8/9 | C | |
| 17 | UI fix | 2011/8/4 | C | |
| 15 | (no comment) | 2011/7/21 | B | |
| 14 | response to customer | 2011/7/21 | C | |
| 12 | bug fix | 2011/6/10 | A | |
| 7 | ver1.0 | 2011/5/10 | B | |

FIG. 5C

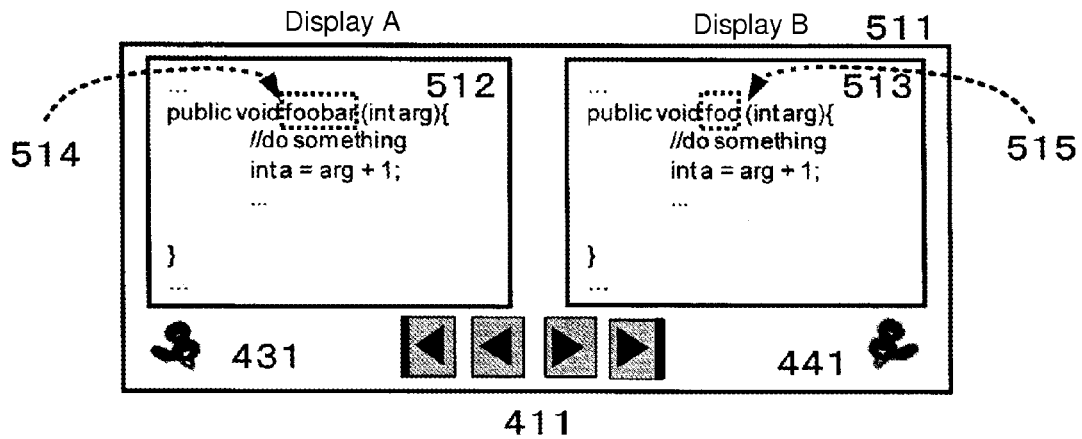

| Match-Only Display | | | 312 |
|---|---|---|---|
| Version | Revision Comment | Revision Date | Reviser |
| 24 | error handling added | 2011/9/23 | D |
| 19 | bug fix | 2011/8/9 | C |
| 17 | UI fix | 2011/8/4 | C |
| 15 | (no comment) | 2011/7/21 | B |
| 14 | response to customer | 2011/7/21 | C |

| Match-Only Display | | | 362 |
|---|---|---|---|
| Version | Revision Comment | Revision Date | Reviser |
| 24 | error handling added | 2011/9/23 | D |
| 19 | bug fix | 2011/8/9 | C |
| 17 | UI fix | 2011/8/4 | C |
| 15 | (no comment) | 2011/7/21 | B |
| 14 | response to customer | 2011/7/21 | C |
| 13 | function added | 2011/6/17 | C |
| 7 | ver1.0 | 2011/5/10 | B |
| 6 | UI added | 2011/5/2 | B |
| 5 | wording added | 2011/4/22 | A |
| 3 | ver0.8 | 2011/4/15 | A |

RETRIEVING REVISIONS IN SOURCE CODE FROM A PLURALITY OF REVISION HISTORY DATA SETS

PRIORITY

This application claims priority to Japanese Patent Application No. 2011-279350 filed Dec. 21, 2011, the entire contents of which are hereby incorporated by reference.

BACKGROUND

The present invention relates generally to a technique for retrieving revisions in source code from a plurality of revision history data sets; and more specifically to a method, device, computer program, and computer program product for retrieving revisions in source code from a plurality of revision history data sets including link information to the source code and version information.

When a problem is detected during software development, the history of changes that have occurred in the code need to be understood. When did the software become contaminated with the problem? What code revision caused the problem? What code revisions have been made since the software became contaminated with the problem? However, as the revision history increases in size, it becomes increasingly time consuming to check the revision history using change management tools, and the efficiency of problem-solving tasks deteriorates.

SUMMARY

Embodiments include a computer implemented method for retrieving a change in source code from a plurality of revision history data sets including link information to the source code and version information. The method includes extracting a first revision history data including a first function unit specified by a user from the plurality of revision history data sets, and displaying on a display device a first list of the first revision history data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

FIG. 2A is a functional block diagram of a computer preferably having a hardware configuration according to FIG. 1.

FIG. 2B is a block diagram of revision history data that may be used in an embodiment of the present invention.

FIG. 3A shows a list including all of the revision history data for a particular file in the prior art.

FIG. 3B illustrates revision history data in accordance with an embodiment.

FIG. 3C illustrates revision history data in accordance with another embodiment.

FIG. 3D illustrates revision history data in accordance with a further embodiment.

FIG. 3E illustrates revision history data in accordance with yet another embodiment.

FIG. 3F illustrates revision history data in accordance with a further embodiment FIG. 3G illustrates revision history data in accordance with another embodiment FIG. 4A shows an example of a graphical user interface which may be used in an embodiment.

FIG. 5A shows an example of revision history data including a user-specified function unit in accordance with an embodiment.

FIG. 5B shows an example of revision history data including a user-specified function unit extracted in accordance with another embodiment.

FIG. 5C shows an example of specification of a particular function unit in accordance with an embodiment.

DETAILED DESCRIPTION

Figure 1:
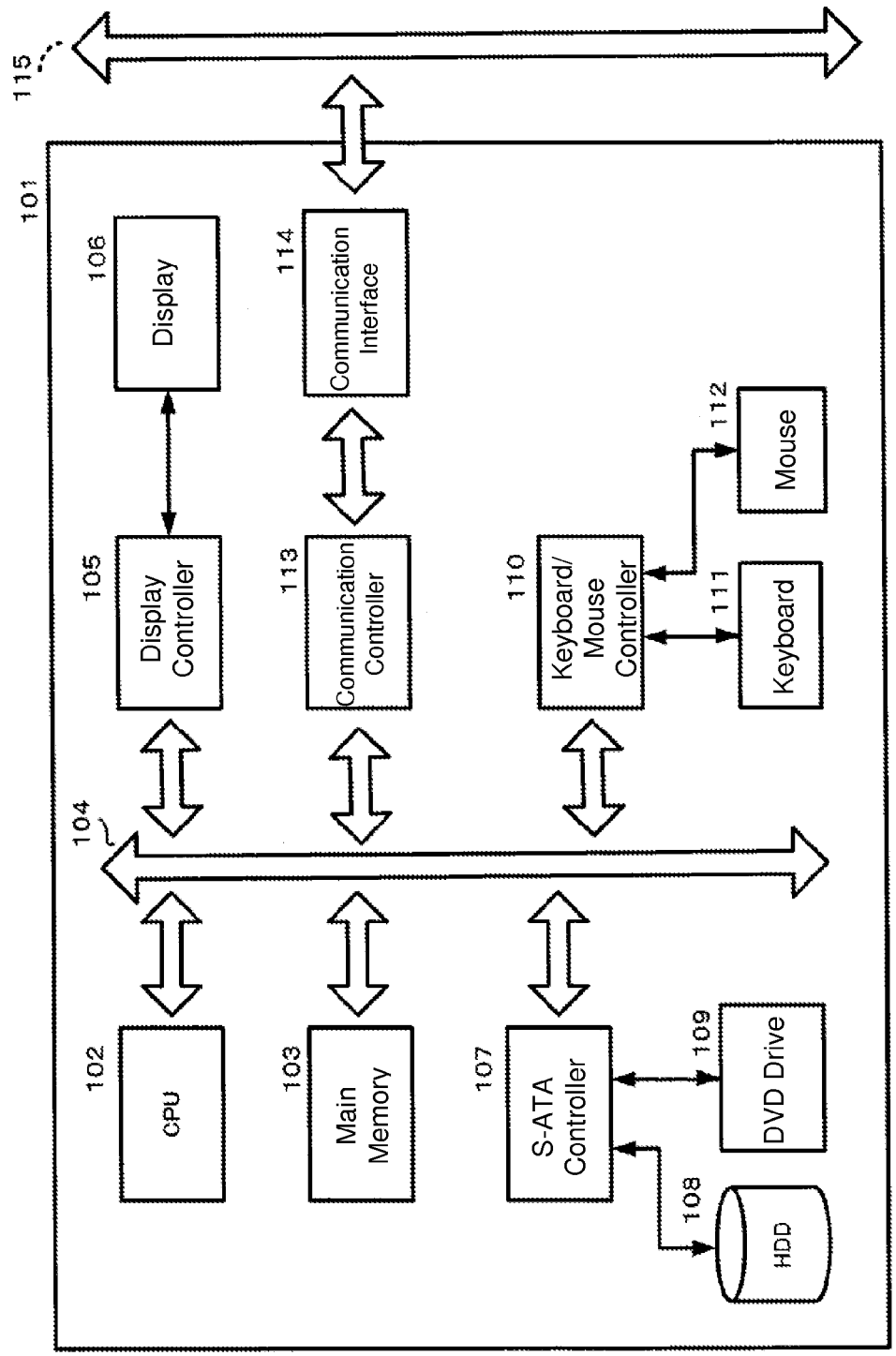
FIG. 1 is a diagram showing an example of a hardware configuration for a computer in accordance with an embodiment of the present invention.

An embodiment of the present invention will now be explained in detail with reference to the drawings. However, the invention as described in the scope of the claims is not limited to the following embodiment, and all combinations of features explained in the embodiment are not necessarily essential to the technical solution of the present invention. Also, the present invention can be embodied in different ways, and it should be clear to any person skilled in the art that various modifications and improvements can be added to the embodiment below.

The same elements are denoted by the same numbers throughout the entire explanation of the embodiment unless otherwise noted. It should be understood that the source code and revision history data lists shown in the drawings are for illustrative purposes and that model source code is used to explain the present invention. It should also be understood that the source code shown in the drawings is for illustrative purposes only and does not correspond in any way to source code for revision history data in a revision history data list.

FIG. 1 is a diagram showing an example of a hardware configuration for a computer in an embodiment of the present invention. This computer (101) includes a CPU (102) and a main memory (103), and these are connected to a bus (104). The CPU (102) is preferably based on a 32-bit or 64-bit architecture. Examples that can be used include the Core i (trademark) series, Core 2 (trademark) series, Atom (trademark) series, Xeon (trademark) series, Pentium (registered trademark) series or Celeron (registered trademark) series from Intel, the Opteron (trademark) series, Phenom (trademark) series, Athlon (trademark) series, Turion (trademark) series, Sempron (trademark) or A-series from AMD, and a Tegra (trademark) mobile processor from NVIVA. A display (106) such as a liquid crystal display (LCD) is connected to the bus (104) via a display controller (105). The display (106) may be embedded in the computer (101). A display (106) may also be connected directly or indirectly to the computer (101). A disk (108), such as a silicon disk or hard disk, and a drive (109), such as a CD, DVD or BD drive may be connected to the bus (104) via a SATA or IDE controller (107). A keyboard (111) and mouse (112) may be connected to the bus (104) via a keyboard/mouse controller (110) or USB bus (not shown).

Programs, such as the operating system, a Java (registered trademark) processing environment such as J2EE, Java (registered trademark) applications, Java (registered trademark) virtual machines (VM), and Java (registered trademark) just-in-time (HT) compilers, as well as other programs and data, are stored on the disk (108) for download to the main memory. Software allowing for the input and editing of text, and character conversion software such as a front end processor (FEP) can also be stored in the disk (108) for download to the main memory. The operation system may be an operating system that supports a graphical user interface (GUI) multi-window environment. Examples include the Windows (registered trademark) operating system from Microsoft Corporation, MacOS (registered trademark) or iOS (registered trademark) from Apple Computer Incorporated, a UNIX (registered trademark)-based system incorporating an X Window System, such as AIX (registered trademark) from International Business Machines Corporation (registered trademark), or Android (registered trademark). If necessary, the drive (109) may be used to install a program on the disk (108) from a CD-ROM, DVD-ROM or BD.

The communication interface (114) can use, for example, an Ethernet (registered trademark) protocol. The communication interface (114) is connected to a bus (104) via a communication controller (113), and functions to physically connect the device (101) to the communication network (115). This provides a network interface layer for the TCP/IP communication protocol in the communication function of the operating system of the device (101). The communication line can be based on a wired LAN environment, or based on a wireless LAN environment, for example, a Wi-Fi standard such as IEEE802.11a/b/g/n. The communication interface may also have a Bluetooth or infrared communication function. It should be clear from the above that a computer according to an embodiment of the present invention may be realized using a computer such as an ordinary personal computer, workstation or mainframe, or using a system including a combination of these. It should also be clear from the above that a computer used in an embodiment of the present invention is not restricted to a particular operating system environment.

FIG. 2A is a functional block diagram of a computer according to an embodiment of the present invention which preferably has a hardware configuration according to FIG. 1. The computer (101) may have a hardware configuration according to FIG. 1. The computer (101) may have an input means (201), editing means (202), extracting means (203), display control means (204), display device (205), and storage means (206). The input means (201) receives from the user source code; the name of a particular target file to display source code or information associated with the source code corresponding to revision history data; and/or a conditional expression including specification of a function unit.

The editing means (202) may be a function included in an application that is able to edit source code. This application may be a text editor or dedicated application software for programming a particular program. This application can be a change management tool such as Rational (registered trademark) TeamConcert (registered trademark) or Rational (registered trademark) ClearCase (registered trademark) sold by International Business Machines Corporation, Subversion, or Concurrent Versions System, which is free software. The editing means (202) allows the user to insert, delete or change any code into the source code. The extracting means (203) extracts revision history data including a user-specified function unit from a plurality of revision history data sets. The extracting means (203) may extract the plurality of revision history data sets from the storage means (206).

In the embodiment of the present invention, a "function unit" is a range having information able to specify a range. For example, a range can be specified or a range is enclosed by a comment. More specifically, a "function unit" may be a variable, function, macro definition, method, subroutine, or tag structure for a structured document. The present invention is not limited to these. When the function unit is a method, the information able to specify a range is a signature. When the function unit is a structured document, it may be a tag. A method may be used in an object-oriented language. The structured document may be in SGML, XML, HTML, or XHTML.

The display control means (204) displays a list of revision history data (213) on the display device (205). The revision history data (212) may be all of the revision history data for a particular file extracted from the storage means (206), or revision history data extracted by the extracting means (203) from all of the revision history data for a particular file. The display control means (204) extracts revision history data including a user-specified function unit from the plurality of revision history data sets, and displays the list of extracted revision history data on the display device (205). The display control means (204) also displays on the display device (205) source code or information associated with the source code for at least two different revision history data sets in the list. Information associated with source code includes differences in source code before and after revision or such differences highlighted in the source code.

The specifying means (not shown) allows the user to specify a version information range for the revision history data. This may be specified by entering version information into a predetermined column or window, such as "Version 14 or Later" (see FIG. 3F) or "Version 16 or Later" (see FIG. 3C). The display device (205) corresponds to the display in FIG. 1. The display device (205) is, for example, a liquid crystal display, and is installed (that is, embedded) in the computer (101), or is connected to the computer (101) via a cable. Also, the display device (205) displays a window (401) shown in FIG. 4A below. This window (401) is described below with reference to FIG. 4A.

The storage means (206) may be installed (that is, embedded) in the computer (101), or connected to the computer (101) via a cable, wired or wireless intranet, or the Internet. The storage means (206) is typically a hard disk drive (HDD) or a solid state drive (SSD). The storage means (206) may store source code (211), revision history data (212), and lists of revision history data (213).

The source code (211) in the present invention may be written in any computer language. The computer language may encompass programming language, style sheet language, hardware description language, data description language, database language, query language, and conversion language. The revision history data (212) may be used to display revisions made in the past to a particular file. Also, the revision history data (212) may be used to display source code when revision history data has been created. The revision history data (212) may also be created in response to a commit operation performed on a particular file after the user has edited the source code. An example of revision history data (212) is described below with reference to FIG. 2B.

The lists of revision history data (213) may be a revision history data list including all revision history data created for a particular file (for example, see revision history data list (301) in FIG. 3A), or a revision history data list of specific revision history data extracted from a revision history data list including all revision history data by the extracting means (203) using a user-specified function unit or version number (for example, see the revision history data lists (311, 321, 331, 341, 351 and 361) in FIG. 3B through FIG. 3G).

Figure 2B:
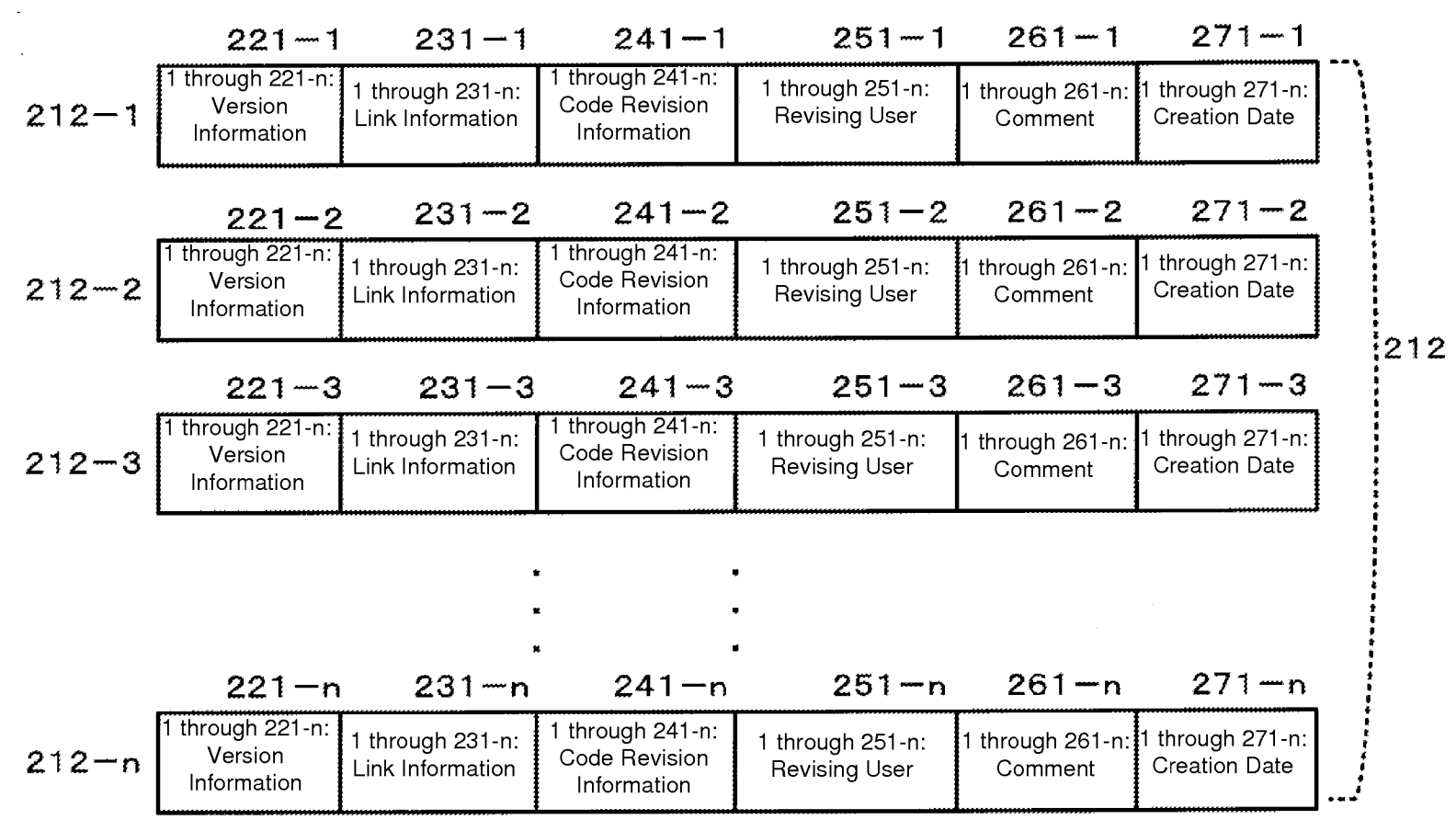

FIG. 2B is a block diagram of revision history data (212) that may be used in an embodiment of the present invention. The revision history data (212) consists of a plurality of revision history data sets (212-1 through 212-*n*) (where n is an integer equal to or greater than 2). These revision history data sets (212-1 through 212-*n*) may be generated, for example, in response to a commit operation performed by a user after editing the source code.

These revision history data sets (212-1 through 212-*n*) include version information (221-1 through 221-*n*), link information (231-1 through 231-*n*), code revision information (241-1 through 241-*n*), the revising user (referred to as the reviser below) (251-1 through 251-*n*), comments (261-1 through 261-*n*), and the creation date (271-1 through 271-*n*).

Version information (221-1 through 221-*n*) is affixed to identify revision history data. This version information (221-1 through 221-*n*) may be a number, letter, code or combination of these. In the version information (221-1 through 221-*n*), a version number is affixed to the revision history data which increases as the revision history becomes more recent. Also, version information (221-1 through 221-*n*) may be used by the display control means (204) to specify particular revision history data among the revision history data sets (212-1 through 212-*n*).

Link information (231-1 through 231-*n*) is used to specify data for regenerating link information to source code or the source code itself. The way in which a link is established to the source code may depend on the change management tool. For example, in a Concurrent Versions System, all of the source code for a version of a particular file is saved at all times. Therefore, the link information (231-1 through 231-*n*) is link destination information which has saved the source code for a version each time. In the case of Subversion, all of the source code for a version of a particular file is saved at a particular time. In subsequent versions, the differences in the version of the source code at that particular time are saved. Therefore, the link information (231-1 through 231-*n*) is link destination information which has saved the source code in the version at a particular time along with the differences.

The code revision information (241-1 through 241-*n*) includes revisions to the source code and information specifying the revised locations. Specification of the revised locations may be performed, for example, by specifying the page or line.

The revising user (251-1 through 251-*n*) is the name of the user who has revised the source code.

A comment (261-1 through 261-*n*) may be a comment on a revision added by the revising user, or a comment added by a user associated with the revising user.

The creation date (271-1 through 271-*n*) is the date on which the revision history data was created (that is, the revision date on which the source code was revised).

The revision history data itself may be any data structure known or used by persons of skill in the art. Also, the revision history data itself may be generated and managed using any method known or used by persons of skill in the art.

The following is an explanation of revision history data lists that may be used in the present invention with reference to the examples of revision history data lists shown in FIG. 3A through FIG. 3G.

FIG. 3A shows a list (revision history data list) of the prior art including all of the revision history data for a particular file. The revision history data list (301) shown in FIG. 3A is a revision history data list including all of the revision history data created for a particular file. It should be understood that the revision history data list shown in FIG. 3A is an example, and that the present invention is not limited to the specifications of the revision history data list shown in FIG. 3A. The specifications of the revision history data list may be any specifications known or used by persons of skill in the art.

The revision history data list (301) includes revision history data having version information 1-26. The revision history data in the revision history data list (301) includes such items as version (version information), revision comment, revision date, and reviser. In FIG. 3A, there is supplemental information to the right of the revision history data list (301) describing the revision made to the source code. This supplemental information may be managed as comments in the revision history data. This supplemental history is not visible (or normally visible) on the display device (205).

The following is an explanation of the ways in which revision history data including user-specified function units is extracted from revision history data in the embodiments of the present invention shown in FIG. 3B through FIG. 3G.

FIG. 3B shows revision history data which matches Condition 1 below, and which is extracted from the revision history data in the revision history data list (301) shown in FIG. 3A; here, list (a) shows the revision history data not matching Condition 1 which has been grayed out, and list (b) shows the revision history data matching Condition 1 which has been extracted.

Condition 1 is as follows:

[Condition 1] Extract revision history data including user-specified function unit "foobar" from all revision history data in revision history data list (301).

Revision history data list (311) is a revision history data list which the extracting means (203) obtains by specifying revision history data including the user-specified function unit "foobar" from all revision history data in the revision history data list (301) in accordance with Condition 1. The unspecified revision history data is grayed out, and the specified revision history data is displayed. By clearing out the unspecified revision history data (Versions 1-13, 16, 18, 20-23 and 25-26), the user can more readily identify the specified revision history data (Versions 14, 15, 17, 19 and 24). The specified revision history data (Versions 14, 15, 17, 19 and 24) includes function unit "foobar" in the revision history.

Revision history data list (312) is the revision history data list obtained by deleting or not displaying the revision history data grayed out from revision history data list (311).

The user may select either revision history data list (311) or revision history data list (312) for display on display device (205). In response to this selection, the display control means (204) may display either revision history data list (311) or revision history data list (312) on display device (205).

FIG. 3C shows revision history data which matches Condition 2 below, and which is extracted from the revision history data in the revision history data list (301) shown in FIG. 3A; here, list (a) shows the revision history data not matching Condition 2 which has been grayed out, and list (b) shows the revision history data matching Condition 2 which has been extracted.

Condition 2 is as follows:

[Condition 2] Extract revision history data including user-specified function unit "foobar" from all revision history data in revision history data list (301) (same as Condition 1 thus far); further extract revision history data including user-specified version information range "16 or later" from the extracted revision history data.

Revision history data list (321) is a revision history data list which the extracting means (203) obtains by specifying revision history data including the user-specified function unit "foobar" from all revision history data in the revision history data list (301), and then further specifying revision history data for version information range "16 or later" from all of the extracted revision history data in the specified revision history data list (the same as 311 in FIG. 3B) in accordance with Condition 2. The unspecified revision history data is grayed out, and the specified revision history data is displayed. By clearing out the unspecified revision history data (Versions 1-16, 18, 20-23 and 25-26), the user can more readily identify the specified revision history data (Versions 17, 19 and 24). The specified revision history data (Versions 17, 19 and 24) includes function unit "foobar" in the revision history and is data in version history range "16 or later".

Revision history data list (322) is the revision history data list obtained by deleting or not displaying the revision history data grayed out from revision history data list (321).

The user may select either revision history data list (321) or revision history data list (322) for display on display device (205). In response to this selection, the display control means (204) may display either revision history data list (321) or revision history data list (322) on display device (205).

FIG. 3D shows revision history data which matches Condition 3 below, and which is extracted from the revision history data in the revision history data list (301) shown in FIG. 3A below; here, list (a) shows the revision history data not matching Condition 3 which has been grayed out, and list (b) shows the revision history data matching Condition 3 which has been extracted.

Condition 3 is as follows:

[Condition 3] Extract revision history data including user-specified function unit "foobar" from all revision history data in revision history data list (301) (same as Condition 1 thus far); further extract revision history data including user-specified function unit "baz" from the extracted revision history data.

Revision history data list (331) is a revision history data list which the extracting means (203) obtains by specifying revision history data including the user-specified function unit "foobar" from all revision history data in the revision history data list (301), and then further specifying revision history data including the user-specified function unit "baz" from all revision history data in the specified revision history data list (same as 311 in FIG. 3B) in accordance with Condition 3. The unspecified revision history data is grayed out, and the specified revision history data is displayed. By clearing out the unspecified revision history data (Versions 1-13, 16-18, 20-26), the user can more readily identify the specified revision history data (Versions 14, 15, and 19). The specified revision history data (Versions 14, 15, and 19) includes either function unit "foobar" or function unit "baz" in the revision history. In other words, Condition 3 is an "and" condition.

Revision history data list (332) is the revision history data list obtained by deleting or not displaying the revision history data grayed out from revision history data list (331).

The user may select either revision history data list (331) or revision history data list (332) for display on display device (205). In response to this selection, the display control means (204) may display either revision history data list (331) or revision history data list (332) on display device (205).

FIG. 3E shows revision history data which matches Condition 4 below, and which is extracted from the revision history data in the revision history data list (301) shown in FIG. 3A; here, list (a) shows the revision history data not matching Condition 4 which has been grayed out, and list (b) shows the revision history data matching Condition 4 which has been extracted.

Condition 4 is as follows:

[Condition 4] Extract revision history data including user-specified function unit "foobar" (revision history data including "foobar") from all revision history data in revision history data list (301) (same as Condition 1 thus far); further extract revision history data including user-specified function unit "baz" (revision data history including "baz") from all of the extracted revision history data in the revision history data list (301); combine revision history data including "foobar" and revision history data including "baz" using the "or" condition.

Revision history data list (341) is a revision history data list which the extracting means (203) obtains by specifying revision history data including the user-specified function unit "foobar" from all revision history data in the revision history data list (301), further specifying revision history data including the user-specified function unit "baz" from all revision history data in the specified revision history data list (301), and combining the revision history data including "foobar" and the revision history including "baz" using the "or" condition in accordance with Condition 4. By clearing out the unspecified revision history data from the combined revision history data (Versions 1-6, 8-11, 13, 16, 18, 20, 22-23 and 25-26), the user can more readily identify the combined revision history data (Versions 7, 12, 14-15, 17, 19, 21 and 24). The specified revision history data (Versions 7, 12, 14-15, 17, 19, 21 and 24) includes either function unit "foobar" or function unit "baz" in the revision history. In other words, Condition 4 is an "or" condition.

Revision history data list (342) is the revision history data list obtained by deleting or not displaying the revision history data grayed out from revision history data list (341).

The user may select either revision history data list (341) or revision history data list (342) for display on display device (205). In response to this selection, the display control means (204) may display either revision history data list (341) or revision history data list (342) on display device (205).

FIG. 3F shows revision history data which matches Condition 5 below, and which is extracted from the revision history data in the revision history data list (301) shown in FIG. 3A; here, list (a) shows the revision history data not matching Condition 5 which has been grayed out, and list (b) shows the revision history data matching Condition 5 which has been extracted.

Condition 5 is as follows:

[Condition 5] Extract revision history data including user-specified function unit "foobar" (revision history data including "foobar") from all revision history data in revision history data list (301); further extract revision history data including user-specified function unit "baz" (revision data history including "baz") from all of the extracted revision history data in the revision history data list (301); combine revision history data including "foobar" and revision history data including "baz" using the "or" condition (same as Condition 4 thus far); further extract revision history data including user-specified version information range "14 or later" from the combined revision history data.

Revision history data list (351) is a revision history data list which the extracting means (203) obtains by specifying revision history data including the user-specified function unit "foobar" from all revision history data in the revision history data list (301), further specifying revision history data including the user-specified function unit "baz" from all revision history data in the specified revision history data list (301), combining the revision history data including "foobar" and the revision history including "baz" using the "or" condition, and specifying the revision history data within the version information range of "14 or later" in accordance with Condition 5. The unspecified revision history data is grayed out, and the specified revision history data is displayed. By clearing out the unspecified revision history data (Versions 1-13, 16, 18, 20, 22-23 and 25-26), the user can more readily identify the specified revision history data (Versions 14-15, 17, 19, 21 and 24). The specified revision history data (Versions 14-15, 17, 19, 21 and 24) includes either function unit "foobar" or function unit "baz" in the revision history, and is data in version history range "14 or later".

Revision history data list (352) is the revision history data list obtained by deleting or not displaying the revision history data grayed out from revision history data list (351).

The user may select either revision history data list (351) or revision history data list (352) for display on display device (205). In response to this selection, the display control means (204) may display either revision history data list (351) or revision history data list (352) on display device (205).

FIG. 3G shows revision history data which matches Condition 6 below, and which is extracted from the revision history data in the revision history data list (301) shown in FIG. 3A; here, list (a) shows the revision history data not matching Condition 6 which has been grayed out, and list (b) shows the revision history data matching Condition 6 which has been extracted.

Condition 6 is as follows:

[Condition 6] Extract revision history data including user-specified function unit "foobar" (revision history data including "foobar") from all revision history data in revision history data list (301); further extract revision history data including user-specified function unit "foo" which is "foobar" with a different name (revision data history including "foo") from all of the extracted revision history data in the revision history data list (301); combine revision history data including "foobar" and revision history data including "foo" using the "or" condition; further extract revision history data including user-specified version information range "13 or later" from the combined revision history data. In the present invention, "different name" is a semantically equivalent function unit.

Revision history data list (361) is a revision history data list which the extracting means (203) obtains by specifying revision history data including the user-specified function unit "foobar" from all revision history data in the revision history data list (301), further specifying revision history data including the user-specified function unit "foo", which is "foobar" by another name, from all revision history data in the specified revision history data list (301), and combining the revision history data including "foobar" and the revision history including "foo" using the "or" condition in accordance with Condition 6. By clearing out the unspecified revision history data from the combined revision history data (Versions 1-2, 4, 8-12, 16, 18, 20-23 and 25-26), the user can more readily identify the combined revision history data (Versions 3, 5-7, 13-15, 17, 19 and 24). The specified revision history data (Versions 3, 5-7, 13-15, 17, 19 and 24) includes either function unit "foobar" or function unit "foo" in the revision history. In other words, Condition 6 is an "or" condition.

Revision history data list (362) is the revision history data list obtained by deleting or not displaying the revision history data grayed out from revision history data list (361).

The user may select either revision history data list (361) or revision history data list (362) for display on display device (205). In response to this selection, the display control means (204) may display either revision history data list (361) or revision history data list (362) on display device (205).

Figure 4B:
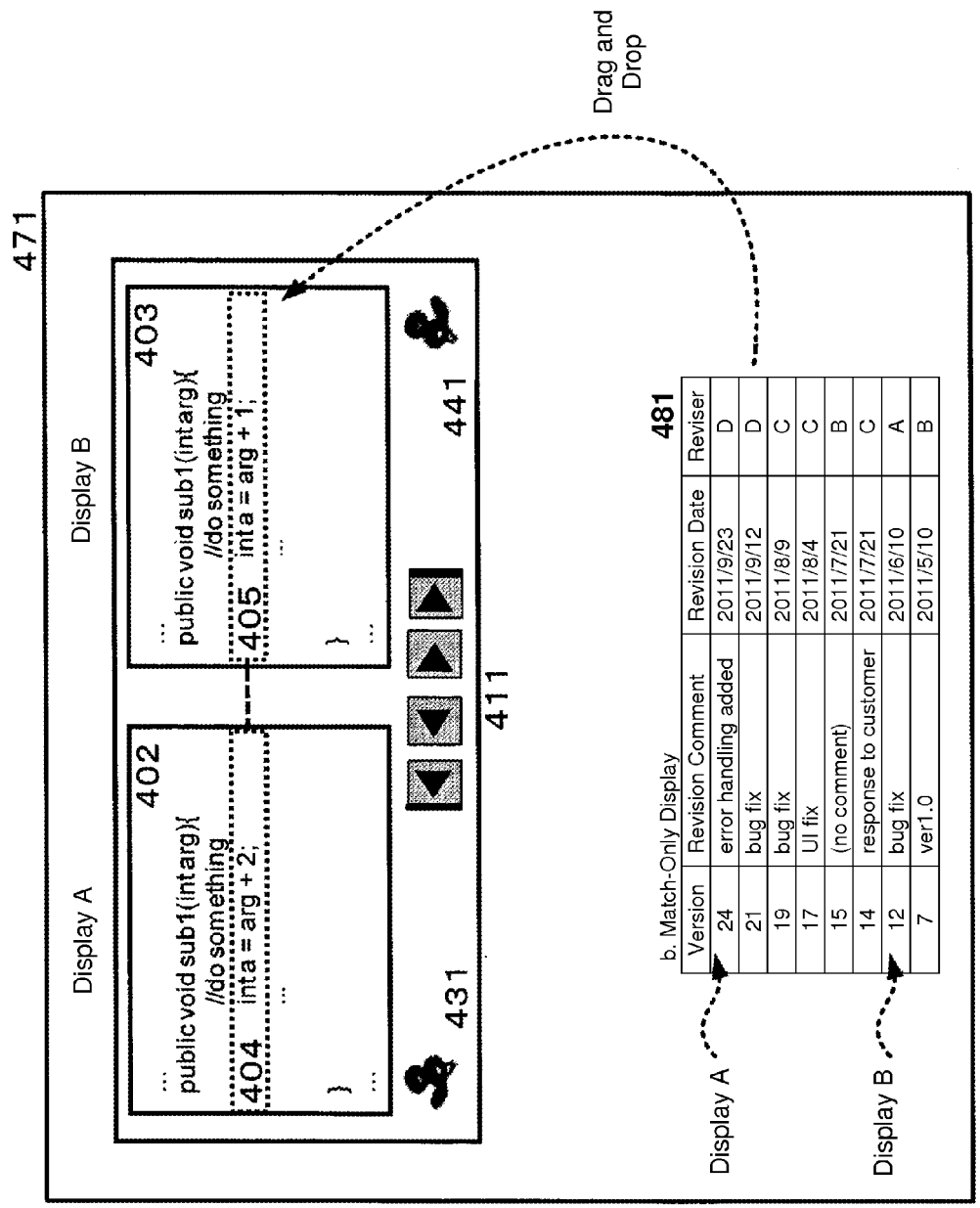
FIG. 4B shows an example of a graphical user interface which may be used in an embodiment.

The following is an explanation of a graphical user interface which may be used in the present invention with reference to the example shown in FIG. 4A through FIG. 4B.

FIG. 4A shows an example of a graphical user interface which may be used in an embodiment of the present invention. The display device (205) of the device (101) shows a window (401) for displaying two source codes. The window (401) has Display A (402) and Display B (403). Also, the window (401) has a button control panel (411) with four buttons used to change the revision history data specified using Display A (402) and Display B (403) to revision history data with another version number. The window (401) has a pin (431) for allowing or disallowing a user to change the revision history data specified using Display A (402) to revision history data with another version number, and a pin (441) for allowing or disallowing a user to change the revision history data specified using Display B (403) to revision history data with another version number.

In FIG. 4A, Display A (402) is arranged on the left side of the window (401), and Display B (403) is arranged on the right side. In another embodiment of the present invention, Display A (402) may be arranged on the right side of the window (401), and Display B (403) may be arranged on the left side.

In the initial state of the window (401), Display A (402) may display source code corresponding to the revision history data with the most recent version number. In the initial state of the window (401), Display B (403) may display source code corresponding to the revision history data with the version number prior to the most recent version number. The initial state of the window (401) is the state in which source code corresponding to revision history data with two different version numbers is first displayed in the window (401).

Alternatively, the user can select revision history data for Display A (402) and select revision history data for Display B (403) from a plurality of revision history data lists for a particular file. In response to the selection, the display control means (204) may display on Display A (402) and Display B (403) the source code or information associated with the source code corresponding to the selected revision history data.

In FIG. 4A, the window (401) has two displays: Display A (402) and Display B (403). In another embodiment of the present invention, the window (401) may have Display C, Display D, . . . Display N. The number for N in Display N may be specified by the user (where N is an integer equal to or greater than 2).

Display A (402) is set to display source code corresponding to the revision history data with the most recent version number for a particular file, and Display B (403) is set to display source code corresponding to the revision history data with the version number prior to the most recent version number for the same file. The following is the difference between the source code displayed on Display A (402) and the source code displayed on Display B (403). Here, "int a=arg+2" (404) is displayed on Display A (402), whereas "int a=arg+1" (405) is displayed on Display B (403). As a result, the user is able to see that the code "int a=arg+2" (404) displayed on Display A (402) has been revised from "int a=arg+1" (405) is displayed on Display A (402). The display control means (204) may identify the differences in the code displayed on Display A (402) and the code displayed on Display B (403) and highlight the identified differences. In the highlighted display, the identified differences (404, 405) may be surrounded by dotted lines as shown in FIG. 4A, the text in the identified differences may be changed to a color other than that of the rest of the text, or the background color of the text in the identified differences may be changed to a color other than that of the default background color for Display A (402) and Display B (403). Also, the display control means (204) may associate the dotted line section (404) in Display A (402) with the dotted line section (405) in Display B (403) so that the user can readily spot the differences.

In the example shown in FIG. 4A, the button control panel (411) has four buttons (421, 422, 423, and 424). When the user clicks on one of the buttons (421, 422, 423, and 424), the display control means (204) as shown below may change the source code displayed on Display A (402) and Display B (403) in order based on the version number or in order based on the creation date and time of the revision history data. In this example, the source code is changed in order based on the version number. However, it should be clear to a person of skill in the art that this example can be applied in similar manner to the order based on the creation date and time of the revision history data.

When button (421) is clicked, the display control means (204) changes the display of the source code on Display A (402) to source code corresponding to the revision history data with the most recent version number, and changes the display of source code on Display B (403) to source code corresponding to the revision history data with the version number prior to (older than) the most recent version number.

When button (422) is clicked, the display control means (204) changes the display of source code on Display A (402) to source code corresponding to the revision history data with the version number one version more recent than (the one right after) the version number of the revision history data corresponding to the currently displayed source code, and changes the display of source code on Display B (403) to source code corresponding to the revision history data with the version number one version more recent than (the one right after) the version number of the revision history data corresponding to the currently displayed source code.

When button (423) is clicked, the display control means (204) changes the display of source code on Display A (402) to source code corresponding to the revision history data with the version number one version older than (the one right before) the version number of the revision history data corresponding to the currently displayed source code, and changes the display of source code on Display B (403) to source code corresponding to the revision history data with the version number one version older than (the one right before) the version number of the revision history data corresponding to the currently displayed source code.

When button (424) is clicked, the display control means (204) changes the display of source code on Display B (403) to source code corresponding to the revision history data with the oldest version number, and changes the display of source code on Display A (402) to source code corresponding to the revision history data with the version number one version more recent than (the one right after) the oldest version number.

In FIG. 4A, the button control panel (411) has four buttons. It should be clear to a person skilled in the art that the button control panel (411) can have any number of buttons with any number of functions.

Pin (431) is used to allow or disallow a user to change the revision history data specified using Display A (402) to revision history data with another version number. In other words, it may be used to indicate to the user whether or not the source code displayed on Display A (402) can be changed by clicking the buttons (421-424). Icon (451) for pin (431) indicates that the user is allowed to change the revision history data specified using Display A (402) to revision history data with another version number, and icon (452) for pin (431) indicates that the user is not allowed to change the revision history data specified using Display A (402) to revision history data with another version number (that is, the function is "pinned").

When the icon for pin (431) is icon (451) and the icon for pin (441) is icon (461), the user can click the buttons (421, 422, 423, and 424), and the display control means (204) in response can change the source code displayed on Display A (402) and Display B (403) in the manner explained above with respect to the button control panel (411).

When the icon for pin (431) is icon (452) and the icon for pin (441) is icon (461), the user can click the buttons (421, 422, 423, and 424), and the display control means (204) in response can change the source code displayed on Display A (402) and Display B (403) in the manner described below.

When button (421) is clicked, the display control means (204) does not change the source code displayed on Display A (402), but changes the source code displayed on Display B (403) to source code corresponding to revision history data with the version number one version older than (the one right before) the most recent version number.

When button (422) is clicked, the display control means (204) does not change the source code displayed on Display A (402), but changes the source code displayed on Display B (403) to source code corresponding to revision history data with the version number one version more recent than (the one right after) the version number of the revision history data corresponding to the source code.

When button (423) is clicked, the display control means (204) does not change the source code displayed on Display A (402), but changes the source code displayed on Display B (403) to source code corresponding to revision history data with the version number one version older than (the one right before) the version number of the revision history data corresponding to the source code.

When button (424) is clicked, the display control means (204) does not change the source code displayed on Display A (402), but changes the source code displayed on Display B (403) to source code corresponding to revision history data with the oldest version number.

Pin (441) is used to allow or disallow a user to change the revision history data specified using Display B (403) to revision history data with another version number. In other words, it may be used to indicate to the user whether or not the source code displayed on Display B (403) can be changed by clicking the buttons (421-424). Icon (461) for pin (441) indicates that the user is allowed to change the revision history data specified using Display B (403) to revision history data with another version number, and icon (462) for pin (441) indicates that the user is not allowed to change the revision history data specified using Display B (403) to revision history data with another version number (that is, the function is "pinned").

When the icon for pin (431) is icon (451) and the icon for pin (441) is icon (461), the user can click the buttons (421, 422, 423, and 424), and the display control means (204) in response can change the source code displayed on Display A (402) and Display B (403) in the manner explained above with respect to the button control panel (411).

When the icon for pin (431) is icon (451) and the icon for pin (441) is icon (462), the user can click the buttons (421, 422, 423, and 424), and the display control means (204) in response can change the source code displayed on Display A (402) and Display B (403) in the manner described below.

When button (421) is clicked, the display control means (204) changes the source code displayed on Display A (402) to source code corresponding to revision history data with the most recent version number, but does not change the source code displayed on Display B (403).

When button (422) is clicked, the display control means (204) changes the source code displayed on Display A (402) to source code corresponding to revision history data with the version number one version more recent than (the one right after) the version number of the revision history data corresponding to the source code, but does not change the source code displayed on Display B (403).

When button (423) is clicked, the display control means (204) changes the source code displayed on Display A (402) to source code corresponding to revision history data with the version number one version older than (the one right before) the version number of the revision history data corresponding to the source code, but does not change the source code displayed on Display B (403).

When button (424) is clicked, the display control means (204) changes the source code displayed on Display A (402) to source code corresponding to revision history data with the oldest version number, but does not change the source code displayed on Display B (403).

When the icon for pin (431) is icon (452) and the icon for pin (441) is icon (462), the user can click the buttons (421, 422, 423, and 424), but the display control means (204) in response will not change the source code displayed on either Display A (402) or Display B (403). This is because both pin (431) and pin (441) are pinned.

FIG. 4B shows an example of a graphical user interface which may be used in an embodiment of the present invention. The window (471) shown in FIG. 4B has Display A (402), Display B (403), button control panel (411), and pins (431) and (441) displayed inside window (401) shown in FIG. 4A, but also a revision history data list (481). This revision history data list (481) is the same as the revision history data list (342) shown in FIG. 3E, and the content of the revision history data list (481) is for illustrative purposes only.

The display control means (204) allows for navigation of the source code displayed in Display A (402) by displaying the source code according to version number in version number order 24, 21, 19, 17, 15, 14 and 12 when the "reverse" button is operated. It also allows for navigation of the source code by displaying the source code according to version number in version number order 12, 14, 15, 17, 19, 21 and 24 when the "forward" button is operated. Also, after "baz" has been extracted in the manner described above, the display control means (204) allows for navigation of the source code displayed in Display B (403) by displaying the source code according to version number in version number order 21, 19, 17, 15, 14, 12 and 7 when the "reverse" button is operated. It also allows for navigation of the source code by displaying the source code according to version number in version number order 7, 12, 14, 15, 17, 19, 21 and 24 when the "forward" button is operated.

In the explanation of FIG. 4A, the source code displayed on Display A (402) and Display B (403) could be navigated according to revision history data with other version numbers by clicking the buttons (421-424) in the button control panel (411). In FIG. 4B, when a revision history data list (481) is displayed in the window (471), a particular line of revision history data in the revision history data list can be selected using a mouse and then dragged and dropped into Display A (402) or Display B (403) in order to change the source code displayed on Display A (402) or Display B (403) to the source code corresponding to the selected revision history data indicated on the left. The following is a detailed explanation of the display changing process.

Display A (402) displays source code corresponding to version 21 in the revision history data list (481). Display B (403) displays source code corresponding to version 12 in the revision history data list (481). The user selects and drags the line indication version 19 in the revision history data list (481) using a mouse, and drops the line into Display B (403). In response to the drag-and-drop operation, the display control means (204) switches the display of source code corresponding to revision history data with version 12 to source code corresponding to revision history data with version 19 on Display B (403).

The following is an explanation with reference to FIG. 5A through FIG. 5C of the extraction of revision history data with a user-specified function unit from the revision history data and the display of a list of the extracted revision history data using the graphical user interface in an embodiment of the present invention.

In FIG. 5A, the graphical user interface in the embodiment of the present invention is used to extract revision history data with a user-specified function unit from the revision history data according to the "and" condition, and display a list of the extracted revision history data. The display device (205) displays a window (401) and the revision history data list (312) of a particular file. The window (401) shown in FIG. 5A is the same as the window (401) shown in FIG. 4A. The window (401) has two displays: Display A (402) and Display B (403).

Also, the revision history data list (312) shown in FIG. 5A is the same as the revision history data list (312) shown in FIG. 3B.

The display control device (204) displays on Display A (402) the source code corresponding to the version 19 revision history data in the revision history data list (312). Also, the display control device (204) displays on Display B (403) the source code corresponding to the version 17 revision history data in the revision history data list (312).

The user wishes to extract the revision history data including the function unit "baz" from the revision history data in the revision history data list (312). Here, the user selects the menu command for displaying a pop-up window in order to enter the function unit. In response to the selection, the display control means (204) displays a pop-up window (501) on the display device (205). Alternatively, the user may display the pop-up window (501) for entering the function unit by right-clicking the window (401). In addition to the pop-up window (501), the display control means (204) may also display a pop-up window (502) allowing the user to click an "and" condition or an "or" condition. Alternatively, the user may be able to click on the target function unit in the source code displayed on Display A (402) and Display B (403) to specify a particular function unit.

Here, the user enters the function unit "baz" in pop-up window (501) and clicks or touches "and" in pop-up window (502). Alternatively, the user may enter search condition "and" and function unit "baz" (for example, "and baz") in the pop-up window (501). In response to the entry, the extracting means (203) extracts revision history data including the user-specified function unit "baz" from the revision history data in the revision history data list (312). The results of the extraction are shown in revision history data list (332). The revision history data list (332) shown in FIG. 5A is the same as the revision history data list (332) shown in FIG. 3D. Next, the display control means (204) replaces revision history data list (312) with revision history data list (332).

In this example, the revision history data with the user-specified function unit "baz" is revision history data with version numbers 14, 15 and 19. This is extracted from the revision history data in revision history data list (312). After extraction, the revision history data with version number 19 displayed before extraction remains in the revision history data list (332) in Display A (402). Thus, the source code displayed in Display A (402) remains unchanged. After extraction, the revision history data with version number 17 displayed before extraction does not remain in the revision history data list (332) in Display B (403). Therefore, the display control means (204) changes the source code displayed on Display B (403) to source code corresponding to revision history data that satisfies the conditions, which is revision history data before version number 17 in the revision history data list (332). In other words, it is changed to source code corresponding to revision history data with version number 15 (not shown).

After "baz" has been extracted, the display control means (204) allows for navigation of the source code displayed in Display A (402) by displaying the source code according to version number in version number order 19 and 15 when the "reverse" button is operated. It also allows for navigation of the source code by displaying the source code according to version number in version number order 15 and 19 when the "forward" button is operated. Also, after "baz" has been extracted in the manner described above, the display control means (204) allows for navigation of the source code displayed in Display B (403) by displaying the source code according to version number in version number order 15 and 14 when the "reverse" button is operated. It also allows for navigation of the source code by displaying the source code according to version number in version number order 14 and 15 when the "forward" button is operated.

In FIG. 5B, the graphical user interface in the embodiment of the present invention is used to extract revision history data with a user-specified function unit from the revision history data according to the "or" condition, and display a list of the extracted revision history data. The display device (205) displays a window (401) and the revision history data list (312) of a particular file. The window (401) shown in FIG. 5B is the same as the window (401) shown in FIG. 4A. The window (401) has two displays: Display A (402) and Display B (403). Also, the revision history data list (312) shown in FIG. 5B is the same as the revision history data list (312) shown in FIG. 3B.

The display control device (204) displays on Display A (402) the source code corresponding to the version 19 revision history data in the revision history data list (312). Also, the display control device (204) displays on Display B (403) the source code corresponding to the version 17 revision history data in the revision history data list (312).

The user wishes to extract the revision history data including the function unit "baz" from all of the revision history data for a particular file in the revision history data list (212) stored in the storage means (206), and merge the extracted revision history data with the revision history data in the revision history data list (312). Here, the user selects the menu command for displaying a pop-up window in order to enter the function unit. In response to the selection, the display control means (204) displays a pop-up window (501) on the display device (205). Alternatively, the user may display the pop-up window (501) for entering the function unit by right-clicking the window (401). In addition to the pop-up window (501), the display control means (204) may also display a pop-up window (502) allowing the user to click an "and" condition or an "or" condition. Alternatively, the user may be able to click on the target function unit in the source code displayed on Display A (402) and Display B (403) to specify a particular function unit.

Here, the user enters the function unit "baz" in pop-up window (501) and clicks or touches "or" in pop-up window (502). Alternatively, the user may enter search condition "or" and function unit "baz" (for example, "or baz") in the pop-up window (501). In response to the entry, the extracting means (203) extracts revision history data including the user-specified function unit "baz" from the all of the revision history data for a particular file stored in the storage means (206). Then, the extracting means (203) merges the extracted revised history data with the revised history data in the revised history data list (312) in accordance with the "or" condition. The results of the merger are shown in revision history data list (342). The revision history data list (342) shown in FIG. 5B is the same as the revision history data list (342) shown in FIG. 3E. Next, the display control means (204) replaces revision history data list (312) with revision history data list (342).

In this example, the revision history data with version numbers 7, 12 and 21 is extracted from all of the revision history data for a particular file stored in the storage means (206) with user-specified function unit "baz", and then the extracted revision history data (version numbers 7, 12 and 21) is merged with the revision history data (14, 15, 17, 19 and 24) in the revision history data list. After extraction, the revision history data with version number 19 displayed before extraction remains in the revision history data list (342) in Display A (402). Thus, the source code displayed in Display A (402)

remains unchanged. Also, after extraction, the revision history data with version number 17 displayed before extraction remains in the revision history data list (332) in Display B (403). Thus, the source code displayed in Display B (403) remains unchanged.

After extraction of "baz" in the manner described above, the display control means (204) allows for navigation of the source code displayed in Display A (402) by displaying the source code according to version number in version number order 24, 21, 19, 17, 15, 14 and 12 when the "reverse" button is operated. It also allows for navigation of the source code by displaying the source code according to version number in version number order 12, 14, 15, 17, 19, 21 and 24 when the "forward" button is operated. Also, after "baz" has been extracted in the manner described above, the display control means (204) allows for navigation of the source code displayed in Display B (403) by displaying the source code according to version number in version number order 21, 19, 17, 15, 14, 12 and 7 when the "reverse" button is operated. It also allows for navigation of the source code by displaying the source code according to version number in version number order 7, 12, 14, 15, 17, 19, and 21 when the "forward" button is operated.

In FIG. 5C, the graphical user interface in the embodiment of the present invention enables the user to specify a specific function unit by a name other than the one for the specific function unit, extract revision history data including the user-specified function unit from the revision history data, and display a list of the extracted revision history data. The display device (205) displays a window (511) and the revision history data list (312) of a particular file. The window (511) has two displays: Display A (512) and Display B (513). Also, the revision history data list (312) shown in FIG. 5B is the same as the revision history data list (312) shown in FIG. 3B.

The display control device (204) displays on Display A (512) the source code corresponding to the version 19 revision history data in the revision history data list (312). Also, the display control device (204) displays on Display B (513) the source code corresponding to the version 17 revision history data in the revision history data list (312).

Display A (512) displays the source code corresponding to the revised history data in version number 19, and Display B (513) displays the source code corresponding to the revised history data in a second version, that, is, version number 17. Therefore, the source code displayed on Display A (512) is understood to be the source code displayed on Display B (513) after editing. Therefore, the user views the dotted-line section (514) in Display A (512) to the dotted-line section (515) in Display B (511), and learns that "foobar" in Display A (512) is "foo" in Display B (513) that has been amended to read "foobar". In other words, it is understood that the function unit "foobar" in Display A (512) is "foo" in Display B (513).

The user wishes to update revision history data (312) so that function unit "foo" in Display B (513) is regarded as function unit "foobar" in Display A (512) by a different name. Therefore, the user, for example, left-clicks and drags "foo" in Display B (513) to select all "foo", and then, for example, left-clicks and drags "foobar" in Display A (512) to select all "foobar". Alternatively, the user selects the menu command to display a pop-up window. When this is selected, the display control means (204) displays the pop-up window (not actually shown in the figure) on the display device (205). The user then indicates that "foo" in Display B (513) is another name for "foobar" in Display A (512) using a conditional expression inside the pop-up window.

When "foo" in Display B (513) has been indicated as another name for "foobar" in Display A (512), the extracting means (203) responds by extracting the revision history data including the user-specified function unit "foo" from all of the revision history data for a specific file stored in the storage means (206). Then, the extracting means (203) merges the revision history data in the revision history data list (312) with the revision history data including the extracted function unit "foo" in accordance with the "or" condition. The merged results are shown in revision history data list (362). The revision history data list (362) shown in FIG. 5C is the same as the revision history data list (362) shown in FIG. 3G. Next, the display control means (204) replaces revision history data list (312) with revision history data list (362).

In this example, when "foo" (515) in Display B (513) has been indicated as another name for "foobar" (514) in Display A (512), the extracting means extracts revision history data with version numbers 3, 5, 6, 7 and 13 from all of the revision history data for a specific file stored in the storage means (206), and then merges the extracted revision history data (version numbers 3, 5, 6, 7 and 13) with the revision history data in the revision history data list (14, 15, 17, 19 and 24). After extraction, the revision history data with version number 19 corresponding to the source code displayed before extraction remains in the revision history data list (362) in Display A (512). Thus, the source code displayed in Display A (512) remains unchanged. Also, after extraction, the revision history data with version number 17 corresponding to the source code displayed before extraction remains in the revision history data list (362) in Display B (513). Thus, the source code displayed in Display B (513) remains unchanged.

After the merger, the display control means (204) allows for navigation of the source code displayed in Display A (512) by displaying the source code according to version number in version number order 24, 19, 17, 15, 14, 13, 7, 6 and 5 when the "reverse" button is operated. It also allows for navigation of the source code by displaying the source code according to version number in version number order 5, 6, 7, 13, 14, 15, 17, 19 and 24 when the "forward" button is operated. Also, after the merger, the display control means (204) allows for navigation of the source code displayed in Display B (513) by displaying the source code according to version number in version number order 19, 17, 15, 14, 13, 7, 6, 5 and 3 when the "reverse" button is operated. It also allows for navigation of the source code by displaying the source code according to version number in version number order 3, 5, 6, 7, 13, 14, 15, 17 and 19 when the "forward" button is operated.

The way in which a user specifies "foo" in Display B (513) as another name for "foobar" in Display A (512) was explained above. Alternatively, the extracting means (203) may determine that "foo" in Display B (513) is another name for "foobar" in Display A (512) from a function unit table (not shown) stored in the storage means (206). The function unit table may be a list defining a particular function unit (for example, "foo") using the same value as another function unit (for example, "foobar"). When the display control means (204) cannot determine that "foo" in Display B (513) is another name for "foobar" in Display A (512) using the function unit, the display control means (204) may allow the user to specify it manually using the method described above.

Figure 6A:
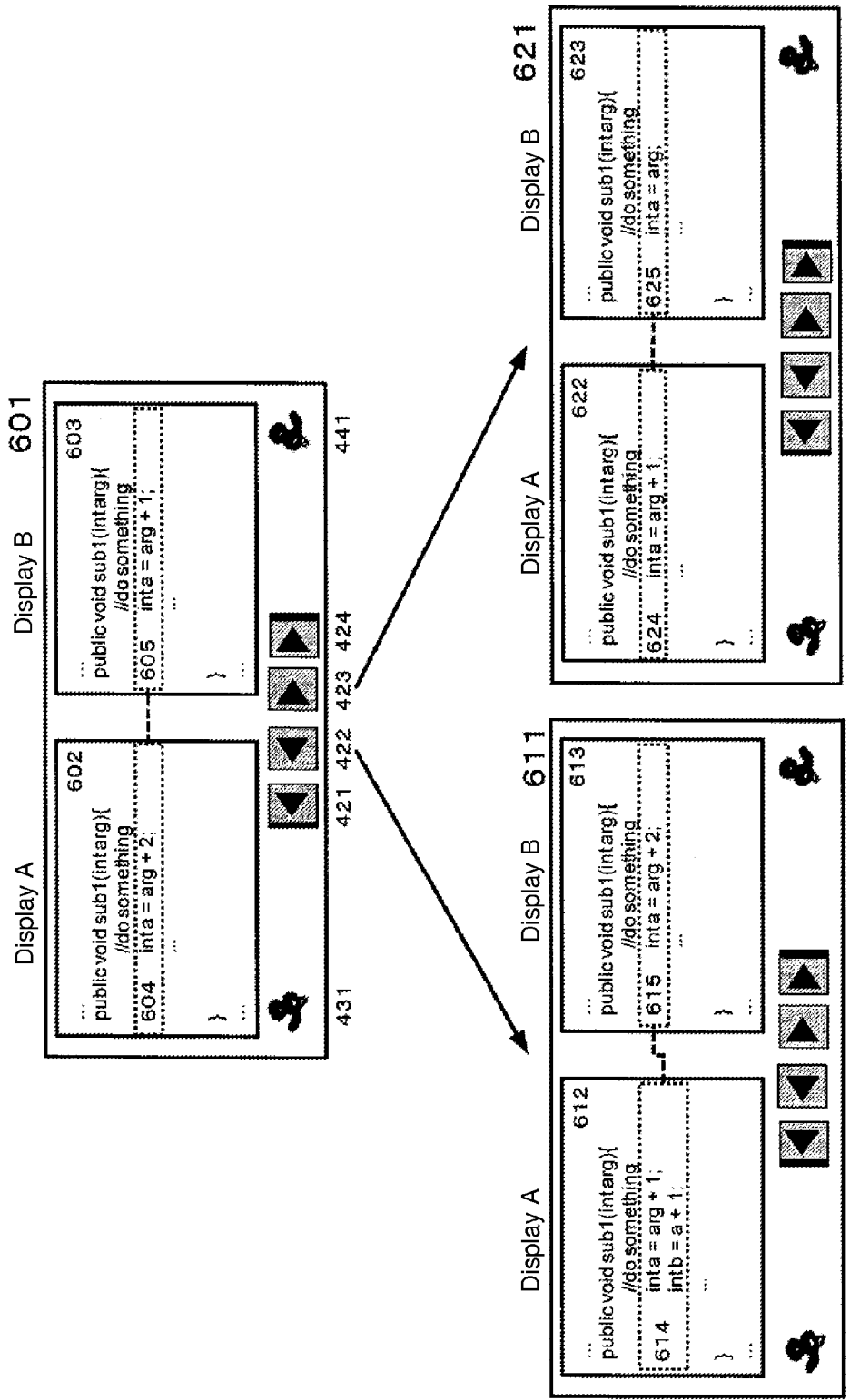
FIG. 6A shows an example according to an embodiment of the present invention in which source code corresponding to revision history data with two different version numbers is shown on a display device, and the display of source code corresponding to each revision history data set is arranged in forward or reverse order based on the version number.
Figure 6B:
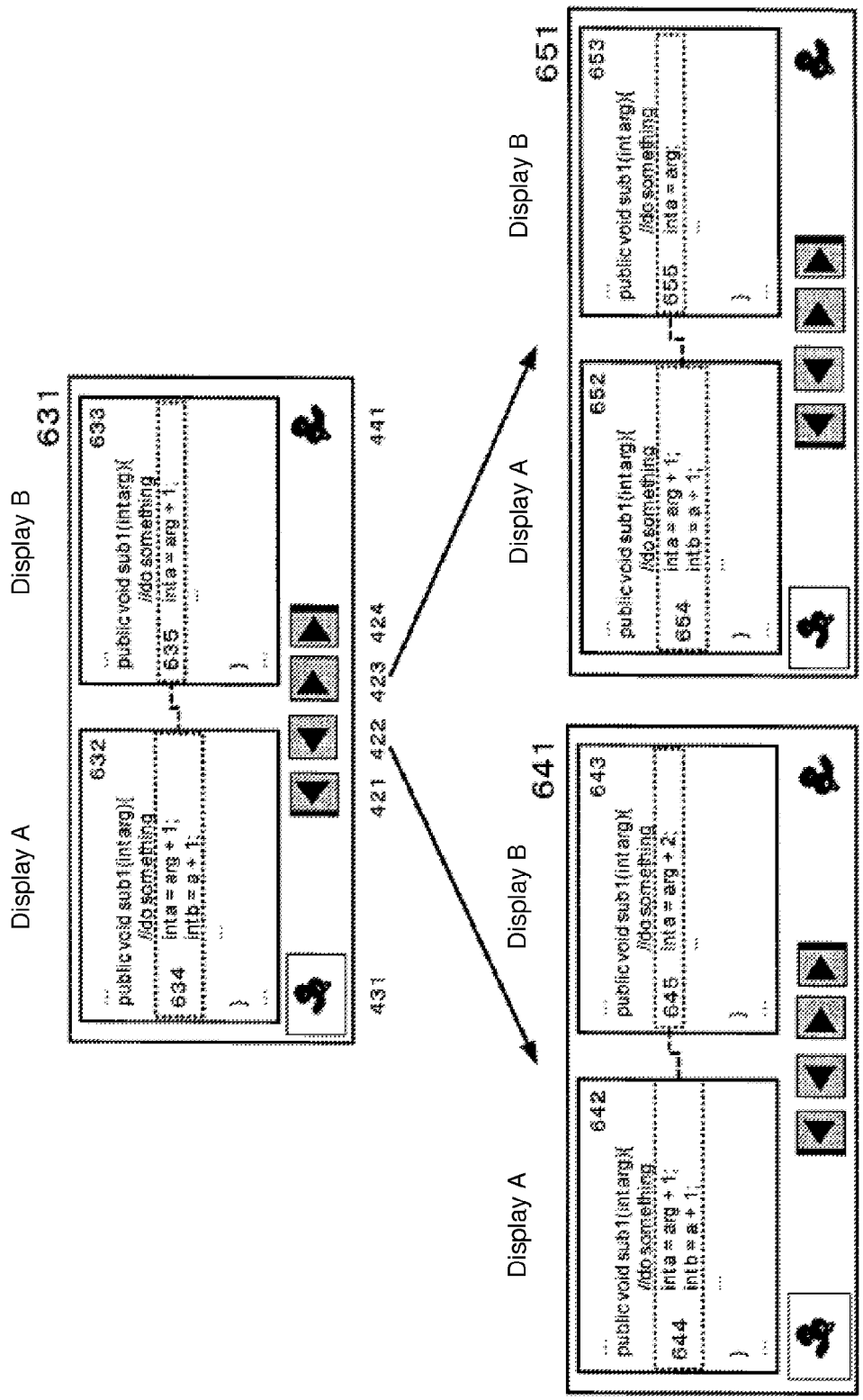
FIG. 6B shows an example according to an embodiment of the present invention in which source code corresponding to revision history data with two different version numbers is shown on a display device, the display of the source code according to one revision history data set is fixed, and the display of source code corresponding to the other revision history data set is arranged in forward or reverse order based on the version number.
Figure 6C:
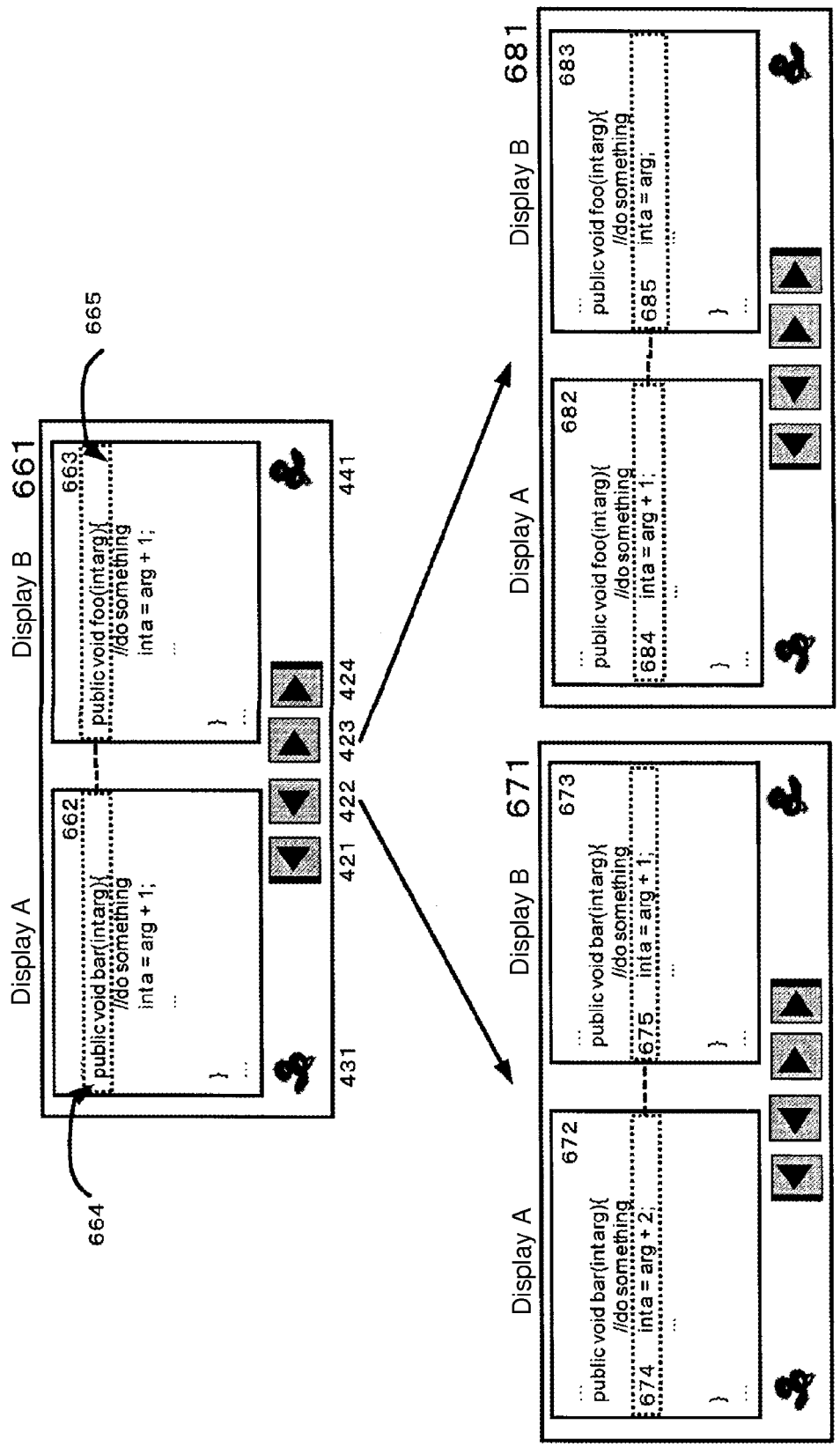
FIG. 6C shows an example according to an embodiment of the present invention in which source code corresponding to revision history data with two different version numbers is shown on a display device, and the display of source code corresponding to each revision history data set is arranged in forward or reverse order based on the version number.

The following is an explanation with reference to FIG. 6A through FIG. 6C of examples according to an embodiment of the present invention in which source code corresponding to revision history data with two different version numbers is displayed on the display unit, and the source code corresponding to each revision history data set is arranged in forward or reverse order with respect to the version number.

FIG. 6A shows an example according to an embodiment of the present invention in which source code corresponding to revision history data with two different version numbers is shown on a display device, and the display of source code corresponding to each revision history data set is arranged in forward or reverse order based on the version number. The display device (205) displays a window (601). The window (601) has two displays: Display A (602) and Display B (603). A revision history data list is not displayed in FIG. 6A, but the display device (205) may alternatively display a revision history data list.

Revision history data sets with version numbers 2, 4, 6 and 7 appears in the revision history data list for a particular file, but revision history data sets with version numbers 3 and 5 do not. Display A (602) displays the source code corresponding to revision history data with version number 6, and Display B (603) displays the source code corresponding to revision history data with version number 4. The differences in the source code displayed on Display A (602) and the source code displayed on Display B (603) are surrounded by dotted lines as indicated by reference symbol 604 and reference symbol 605 for highlighted display, and the dotted-line section (604) in Display A (602) and the dotted-line section (605) in Display B (603) are optionally connected for highlighted display.

The user, for example, left-clicks button (422). When button (422) is clicked, the display control means (204) changes the display of source code on Display A (602) to source code corresponding to the revision history data with the version number one version more recent than (the one right after) the version number of the revision history data corresponding to the currently displayed source code, and changes the display of source code on Display B (603) to source code corresponding to the revision history data with the version number one version more recent than (the one right after) the version number of the revision history data corresponding to the currently displayed source code. In other words, as shown in window (611), the display control unit (204) displays the source code corresponding to the revision history data with version number 7, which is the one version more recent than version number 6, in Display A (612), and displays the source code corresponding to the revision history data with version number 6, which is the one version more recent than version number 4, in Display B (613). The display control means (204) highlights the source code displayed on Display A (612) and the source code displayed on Display B (613) by surrounding the source code with dotted lines as indicated by reference symbol 614 and reference symbol 615, and optionally highlights the dotted-line section (614) in Display A (612) and the dotted-line section (615) in Display B (613) by connecting the sections with a dotted line.

The user, for example, left-clicks button (423). When button (423) is clicked, the display control means (204) changes the display of source code on Display A (602) to source code corresponding to the revision history data with the version number one version older than the version number of the revision history data corresponding to the currently displayed source code, and changes the display of source code on Display B (603) to source code corresponding to the revision history data with the version number one version older than the version number of the revision history data corresponding to the currently displayed source code. In other words, as shown in window (621), the display control unit (204) displays the source code corresponding to the revision history data with version number 4, which is one version older than version number 6, in Display A (622), and displays the source code corresponding to the revision history data with version number 2, which is one version older than version number 4, in Display B (613). The display control means (204) highlights the source code displayed on Display A (622) and the source code displayed on Display B (623) by surrounding the source code with dotted lines as indicated by reference symbol 624 and reference symbol 625, and optionally highlights the dotted-line section (624) in Display A (622) and the dotted-line section (625) in Display B (623) by connecting the sections with a dotted line.

FIG. 6B shows an example according to an embodiment of the present invention in which source code corresponding to revision history data with two different version numbers is shown on a display device, the display of the source code according to one revision history data set is fixed, and the display of source code corresponding to the other revision history data set is arranged in forward or reverse order based on the version number. The display device (205) displays a window (631). The window (631) has two displays: Display A (632) and Display B (633). A revision history data list is not displayed in FIG. 6B, but the display device (205) may alternatively display a revision history data list.

Revision history data sets with version numbers 2, 4, 6, 7 and 8 appears in the revision history data list for a particular file, but revision history data sets with version numbers 3 and 5 do not. Display A (632) displays the source code corresponding to revision history data with version number 7, and Display B (633) displays the source code corresponding to revision history data with version number 4. The differences in the source code displayed on Display A (632) and the source code displayed on Display B (633) are surrounded by dotted lines as indicated by reference symbol 634 and reference symbol 635 for highlighted display, and the dotted-line section (634) in Display A (632) and the dotted-line section (635) in Display B (633) are optionally connected for highlighted display.

The user, for example, left-clicks the pin (431) associated with Display A (632), and then left-clicks button (422).

When the pin (431) is clicked, the display control means (204) fixes the display of the source code on Display A (632). Next, when button (422) is clicked, the display control means (204) responds, as shown in window (641), by leaving the display of source code on Display A (642) unchanged, and by displaying on Display B (643) the source code corresponding to the revision history data with version number 6, which is one version more recent than version number 4. Also, the display control means (204) surrounds the differences in the source code displayed on Display A (642) and the source code displayed on Display B (643) by dotted lines as indicated by reference symbol 644 and reference symbol 645 for highlighted display, and optionally connects the dotted-line section (644) in Display A (642) and the dotted-line section (645) in Display B (643) for highlighted display.

The user, for example, left-clicks the pin (431) associated with Display A (632), and then left-clicks button (423).

When the pin (431) is clicked, the display control means (204) fixes the display of the source code on Display A (632). Next, when button (422) is clicked, the display control means (204) responds, as shown in window (651), by leaving the display of source code on Display A (652) unchanged, and by displaying on Display B (653) the source code corresponding to the revision history data with version number 2, which is one version older than version number 4. Also, the display control means (204) surrounds the differences in the source code displayed on Display A (652) and the source code displayed on Display B (653) by dotted lines as indicated by reference symbol 654 and reference symbol 655 for highlighted display, and optionally connects the dotted-line section (654) in Display A (652) and the dotted-line section (655) in Display B (653) for highlighted display.

FIG. 6C shows an example according to an embodiment of the present invention in which source code corresponding to revision history data with two different version numbers is shown on a display device, and the display of source code corresponding to each revision history data set is arranged in forward or reverse order based on the version number. The display device (205) displays a window (661). The window (661) has two displays: Display A (662) and Display B (663). A revision history data list is not displayed in FIG. 6C, but the display device (205) may alternatively display a revision history data list.

In the revision history data list for a particular file, some revision history data includes the function unit "bar" (version numbers 6 and 8), some revision history data includes the user-specified function unit "foo", which is another name for the function unit "bar" (version numbers 2 and 4), and revision history data with version numbers 3, 5 and 7 does not exist. Display A (662) displays source code corresponding to revision history data with version number 6, and Display B (663) displays source code corresponding to revision history data with version number 4. The differences in the source code displayed on Display A (662) and the source code displayed on Display B (663) are surrounded by dotted lines as indicated by reference symbol 664 and reference symbol 665 for highlighted display, and the dotted-line section (664) in Display A (662) and the dotted-line section (665) in Display B (663) are optionally connected for highlighted display.

The user, for example, left-clicks button (422). When button (422) is clicked, as shown in window (671), the display control unit (204) displays the source code corresponding to the revision history data with version number 8, which is the one version more recent than version number 6, in Display A (672), and displays the source code corresponding to the revision history data with version number 6, which is the one version more recent than version number 4, in Display B (673). The display control means (204) highlights the source code displayed on Display A (672) and the source code displayed on Display B (673) by surrounding the source code with dotted lines as indicated by reference symbol 674 and reference symbol 675, and optionally highlights the dotted-line section (674) in Display A (672) and the dotted-line section (675) in Display B (673) by connecting the sections with a dotted line.

The user, for example, left-clicks button (423). When button (423) is clicked, as shown in window (681), the display control unit (204) displays the source code corresponding to the revision history data with version number 4, which is one version older than version number 6, in Display A (682), and displays the source code corresponding to the revision history data with version number 2, which is one version older than version number 4, in Display B (683). The display control means (204) highlights the source code displayed on Display A (682) and the source code displayed on Display B (683) by surrounding the source code with dotted lines as indicated by reference symbol 684 and reference symbol 685, and optionally highlights the dotted-line section (684) in Display A (682) and the dotted-line section (685) in Display B (683) by connecting the sections with a dotted line.

Figure 7:
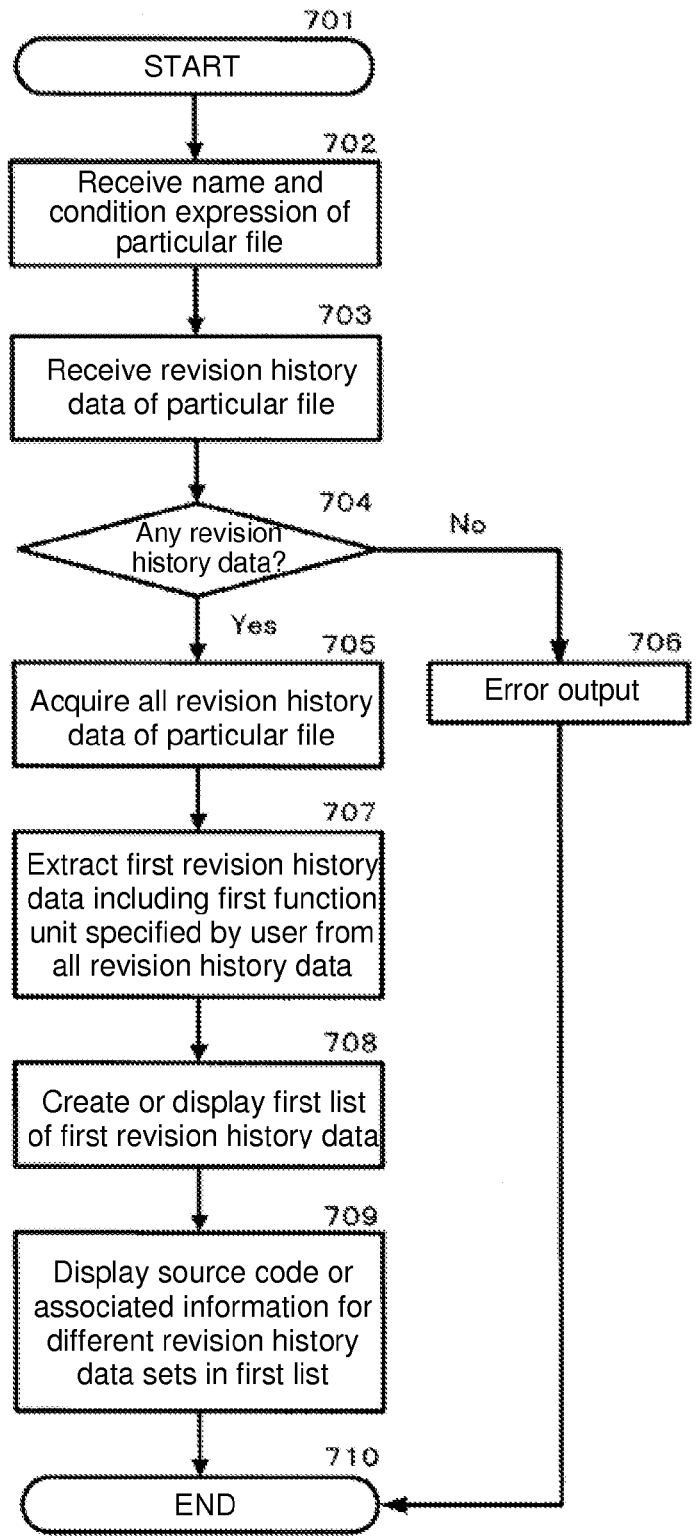
FIG. 7 is a flowchart of the operations performed according to an embodiment of the present invention to extract revision history data including a user-specified function unit from a plurality of revision history data sets for a particular file, display or create a list of the extracted revision history data, and display the source code or information associated with the source code corresponding to at least two revision history data sets in the list.

FIG. 7 is a flowchart of the operations performed according to an embodiment of the present invention to extract revision history data including a user-specified function unit from a plurality of revision history data sets for a particular file, display or create a list of the extracted revision history data, and display the source code or information associated with the source code corresponding to at least two revision history data sets in the list. In Block 701, the computer (101) starts the process.

In Block 702, the input means (201) receives from a user the name of a particular file whose source code or information associated with the source code corresponding to revision history data is to be displayed. Optionally, it receives input of a conditional expression including specification of a function unit. Alternatively, instead of receiving a conditional expression in Block 702, the input means (201) responds to confirmation of revision history data for a particular file in Block 704 by enabling input of a conditional expression via the input means (201).

In Block 703, the extracting means (203) receives the name of a particular file and, optionally, a conditional expression. In response, the extracting means (203) requests the revision history data for the particular file inputted by the user. In Block 704, the extracting means (203) advances the process to Block 705 when there is revision history data for the particular file in the storage means (206). When there is no revision history data in the storage means (206), the extracting means (203) advances the process to Block 706 for error output.

In Block 705, the extracting means (203) responds to the presence of revision history data in the storage means (206) by acquiring all of the revision history data (see FIG. 2B) from the storage means (206). In Block 706, the extracting means (204) responds to the absence of revision history data in the storage means (206) by displaying an error message on the display device (205) indicating that the process cannot be executed because revision history data (see FIG. 2B) cannot be acquired. In Block 707, the extracting means (203) extracts revision history data (corresponding to the "first revision history data" in the claims) including the user-specified function unit (corresponding to the "first function unit" in the claims) from all of the acquired revision history data. In Block 708, the display control means (204) creates a list of the extracted first revision history data (corresponding to the "first list" in the claims 213) in the storage means (206).

Alternatively, the display control means (204) displays on the display device (205) the first list of the extracted first revision history data (213). See, for example, revision history data list (311) in FIG. 3B or revision history data list (312) in the same figure. In Block 709, the display control means (204) displays on the display device (205) the source code or information associated with the source code corresponding to at least two different revision history data sets in the first list. See, for example, Display A (402) and Display B (403) in FIG. 4A. In Block 710, the display control means (204) receives an end-processing instruction, and responds by ending the process.

Figure 8A:
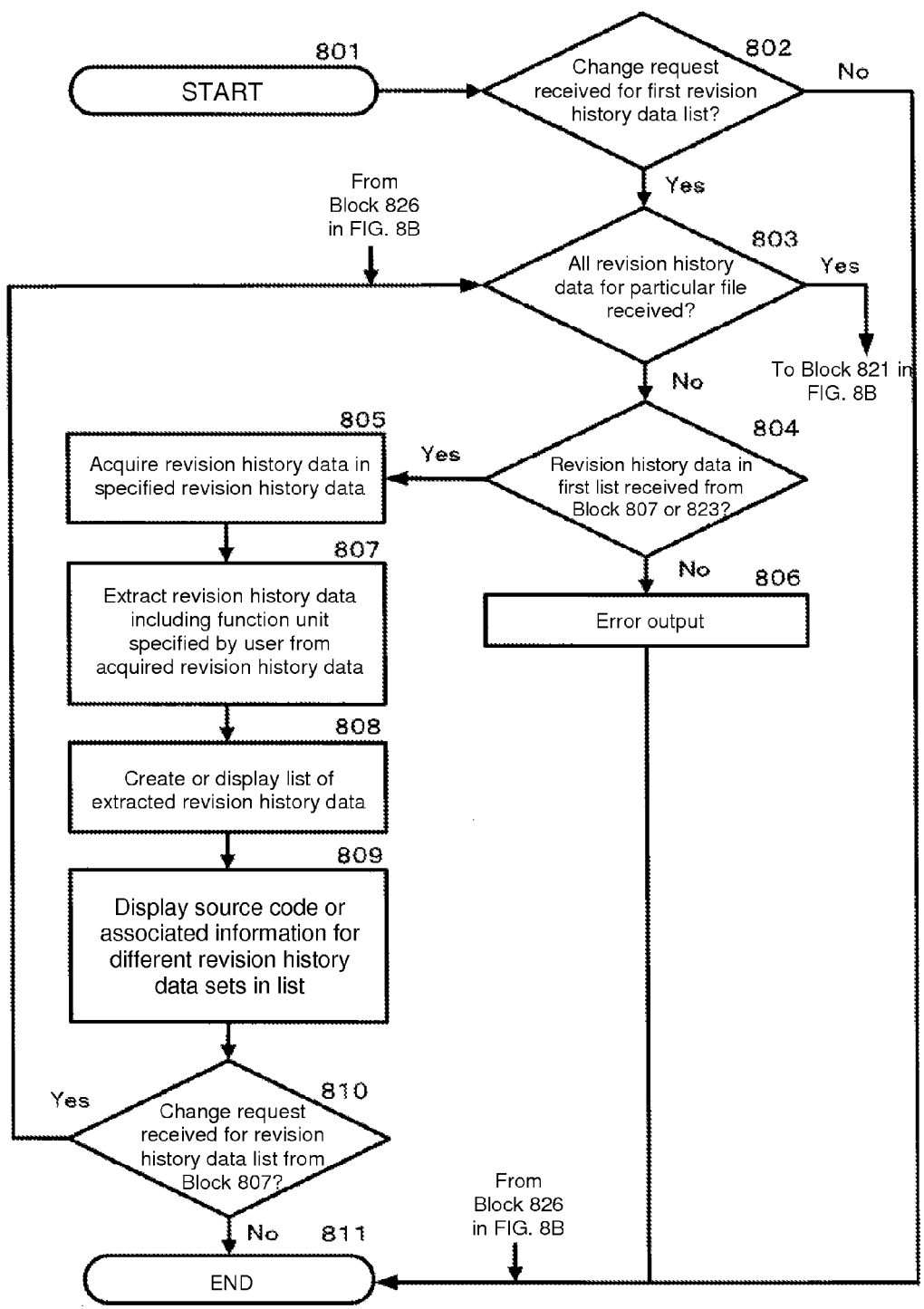
FIG. 8A is a flowchart of the operations performed to process the revision history data extracted in accordance with the flowchart shown in FIG. 7, and automatically updates the list of revision history data.
Figure 8B:
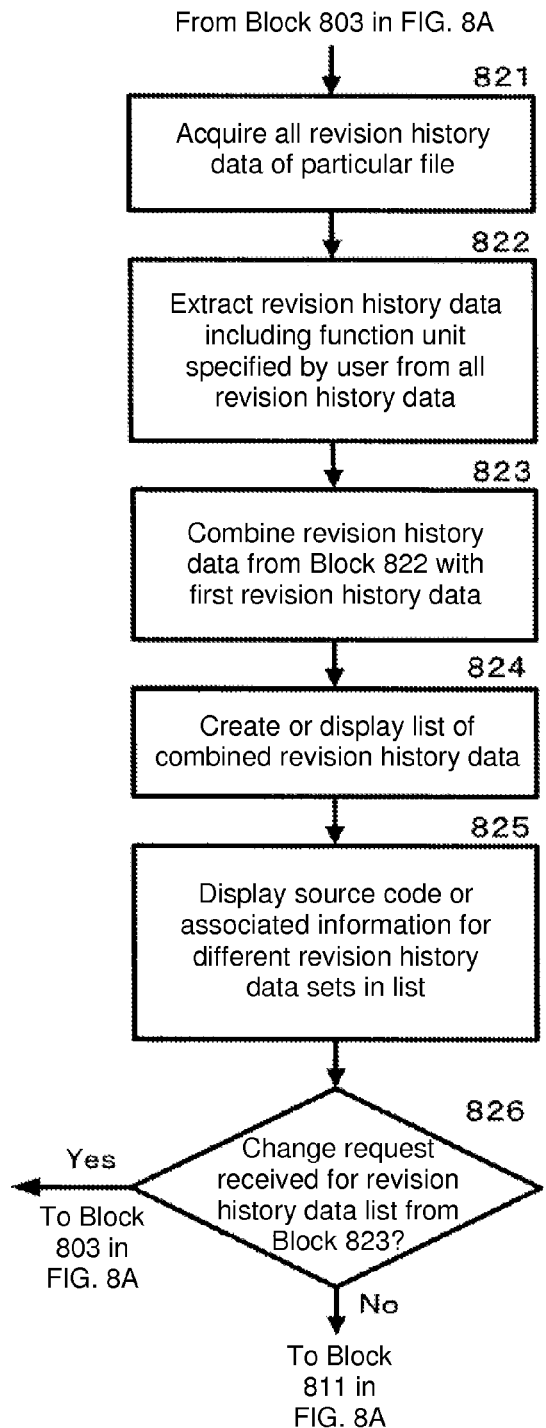
FIG. 8B is a flowchart of the operations performed to process the revision history data extracted in accordance with the flowchart shown in FIG. 7, and automatically updates the list of revision history data.

FIG. 8A and FIG. 8B are flowcharts of the operations performed to further process the revision history data extracted in accordance with the flowchart shown in FIG. 7, and automatically update the list of revision history data. In Block 801, the computer (101) begins the automatic update process.

In Block 802, the input means (201) receives input from a user. The extracting means (203) determines whether or not the input received from the user is a revision request for the revision history data in the first revision history data list extracted in Block 707 shown in FIG. 7. The revision request may have a conditional expression including a function unit other than the first function unit (corresponding to the "second function unit" in the claims). The extracting means (203) advances the process to Block 803 when the received input is a revision request for the revision history data in the first revision history data list. The extracting means (203) ends the automatic update process when the received input is not a revision request for the revision history data in the first revision history data list (Block 811).

In Block 803, the extracting means (203) determines whether or not all of the revision history data for a particular file is being targeted by the revision request in response to the received input being a revision request for revision history data in the first revision history data list, a revision request for revision history data extracted in Block 807 shown in FIG. 8A, or a revision request for revision history data combined in Block 823 shown in FIG. 8B. For example, when the conditional expression in the revision request includes "or", the extracting means (203) may determine that the revision request targets all of the revision history data for a particular file. When the conditional expression in the revision request includes "and", the extracting means (203) may determine that the revision request does not target all of the revision history data for a particular file. When all of the revision history data for a particular file is targeted by the revision request, the extracting means (203) advances the process to Block 821 shown in FIG. 8B. When all of the revision history data for a particular file is not targeted by the revision request, the extracting means (203) advances the process to Block 804.

In Block 804, the extracting means (203) determines whether or not the revision request targets the first revision history data, revision history data extracted in Block 807, or revision history data combined in Block 823. For example, extracting means (203) determines that the revision request targets the first revision history data when the conditional expression in the revision request is "and". When the revision request targets the first revision history data, revision history data extracted in Block 807, or revision history data combined in Block 823, the extracting means (203) advances the process to Block 805. When the revision request does not target the first revision history data, revision history data extracted in Block 807, or revision history data combined in Block 823, the extracting means (203) responds by advancing the process to Block 806 for error output.

In Block 805, the extracting means (203) acquires from the storage means (206) all of first revision history data specified in Block 804, revision history data extracted in Block 807, or revision history data combined in Block 823 when there is revision history data specified by the revision request in Block 804.

In Block 806, the display control means (204) may display on the display device (205) an error message indicating that the revision request cannot be executed or that the revision request is not valid when the revision request does not target the first revision history data, revision history data extracted in Block 807, or revision history data combined in Block 823.

In Block 807, the extracting means (203) extracts revision history data including the user-specified function unit from all of the acquired revision history data. When the revision history data specified in Block 805 is the first revision history data, the extracting means (203) extracts the revision history data including the second function unit inputted by the user (corresponding to the "second revision history data" in the claims) from all of the acquired first revision history data.

In Block 808, the display control means (204) creates in the storage means (206) the list of revision history data (213) extracted in Block 807. Alternatively, the display control means (204) displays on the display device (205) the list of revision history data (213) extracted in Block 807. When the revision history data specified in Block 805 is the first revision history data, the display control means (204) creates in the storage means (206) the list of second revision history data extracted in Block 807 (corresponding to the "second list" in the claims 213). Alternatively, the display control means (204) displays on the display device (205) the extracted second list of second revision history data (213). For example, see the revision history data list (331) in FIG. 3D, the revision history data list (332) in the same figure, and the revision history data list (332) in FIG. 5A.

In Block 809, the display control means (204) displays on the display device (205) the source code or information associated with the source code corresponding to at least two different revision history data sets in the list created in Block 808. When the revision history data specified in Block 805 is the first revision history data, the display control means (204) displays on the display device (205) the source code or information associated with the source code corresponding to at least two different revision history data sets in the second list. See, for example, Display A (402) and Display B (403) in FIG. 5A.

In Block 810, the input means (201) receives input from the user. The extracting means (203) determines whether or not the input received from the user is a revision request for revision history data in the revision history data list extracted in Block 807. The revision request may have a condition expression including specification of a function unit different from the first function unit specified in Block 707 of FIG. 7 and the function unit specified in Block 807. When the received input is a revision request for revision history data in the revision history data list extracted in Block 807, the extraction means (203) responds by returning the processing to Block 803. When the received input is not a revision request for revision history data in the revision history data list extracted in Block 807, the extraction means (203) responds by ending the automatic update process (Block 811). When the revision history data specified in Block 805 is the first revision history data, the extracting means (203) determines whether or not the input received from the user is a revision request for revision history data in the second revision history data list extracted in Block 807. The revision request may have a conditional expression including specification of a function unit different from the first function unit and the second function unit (referred to below as the "third function unit"). When the received input is a revision request for revision history data in the second revision history data list, the extraction means (203) responds by returning the processing to Block 803. When the received input is not a revision request for revision history data in the second revision history data list, the extraction means (203) responds by ending the automatic update processing (Block 811).

In Block 821, when the revision request received in Block 803 targets all of the revision history data for a specific file, the extracting means (203) acquires from the storage means (206) all of the revision history data (see FIG. 2B). Because the same process is performed in Block 705, the extracting means (203) is able to omit Block 821 when the revision history data acquired in Block 705 is in the memory.

In Block 822, the extracting means (203) extracts the revision history data (corresponding to the "third revision history data" in the claims) including the user-inputted function unit (corresponding to the "second function unit" in the claims) from all of the revision history data acquired in Block 821. In Block 823, the display control means combines the third revision history data extracted in Block 822 with the first revision history data extracted in Block 707 in FIG. 7. In other words, the display control means (204) adds the third revision history data extracted in Block 822 to the first revision history data extracted in Block 707 of FIG. 7.

In Block 824, the display control means (204) creates in the storage means (206) a list (corresponding to the "third list" in the claims) of the revision history data merged in Block 823 (corresponding to the "fourth revision history data") (213). Alternatively, the display control means (204) displays on the display device (205) the third list of fourth revision history data (213). See, for example, revision history data list (341) in FIG. 3E, revision history data list (342) in the same figure, and revision history data list (342) in FIG. 5B. In Block 825, the display control means (204) displays on the display device (205) the source code or information associated with the source code corresponding to at least two different revision history data sets in the third list. See, for example, Display A (402) and Display B (403) in FIG. 5B.

In Block 826, the input means (201) receives input from the user. The extracting means (203) determines whether or not the input received from the user is a revision request for revision history data in the fourth revision history data list obtained in Block 823. The revision request may have a conditional expression including specification of a function unit (referred to below as the "fourth function unit") other than the first function unit specified in Block 707 of FIG. 7 and the second function unit specified in Block 822. When the received input is a revision request for revision history data in the revision history data list combined in Block 823 (the third revision history data list), the extracting means (203) responds by returning the process to Block 803. When the received input is not a revision request for revision history data in the revision history data list combined in Block 823 (the third revision history data list), the extracting means (203) responds by ending the automatic update process (Block 811).

Figure 8C:
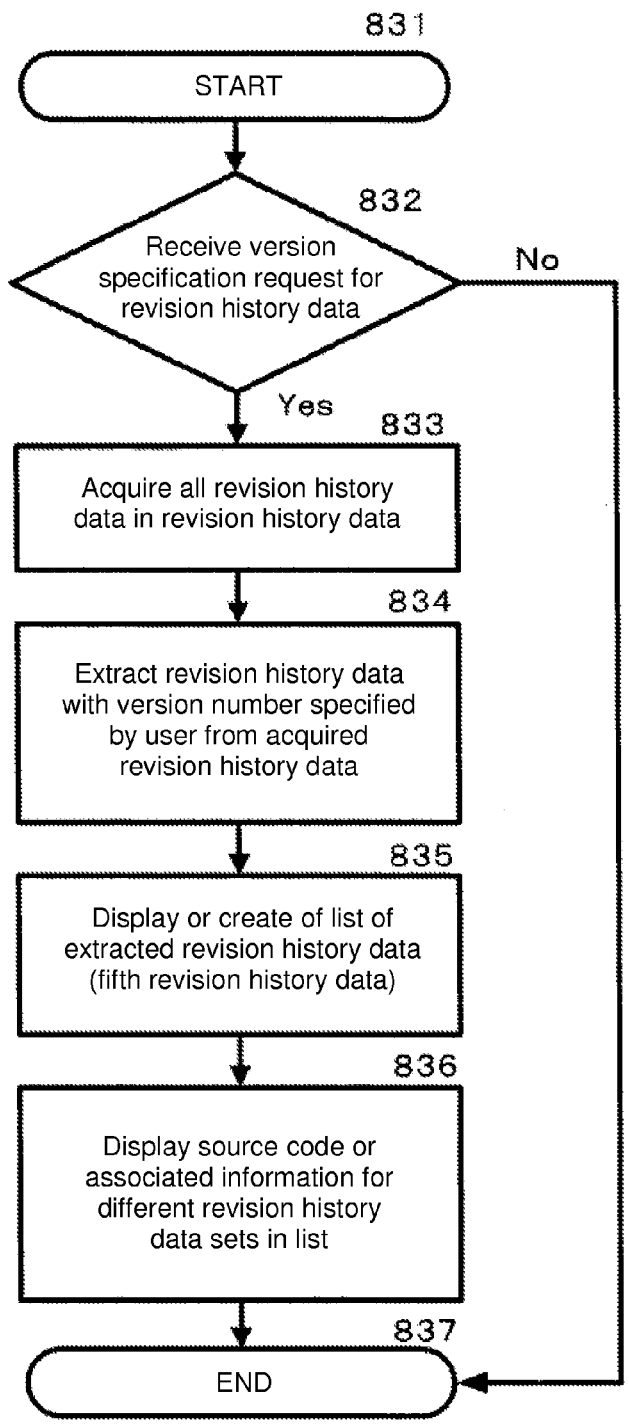
FIG. 8C is a flowchart of the process performed to extract revision history data with a version number within a user-specified range from the revision history data extracted in accordance with the flowcharts shown in FIG. 7, FIG. 8A and FIG. 8B.

FIG. 8C is a flowchart of the process performed to extract revision history data with a version number within a user-specified range from the revision history data extracted in accordance with the flowcharts shown in FIG. 7, FIG. 8A and FIG. 8B. The revision history data extracted in the flowcharts shown in FIG. 8A and FIG. 8B may be the first revision history data extracted in Block 707 of FIG. 7, the second revision history data extracted in Block 807 of FIG. 8A, and the third revision history data extracted in Block 822. In Block 831, the computer (101) begins the process of extracting revision history data with a version number within the user-specified range. In Block 832, the input means (201) receives input from the user. The extracting means (203) determines whether or not the input received from the user is a revision request for extracting revision history data with a version number within the user-specified range from the first, second or third revision history data list. The revision request may have a conditional expression including a range for specifying the version number of the revision history data. When the received input is a revision request for extracting revision history data with a version number within a user-specified range, the extracting means (203) responds by advancing the process to Block 833. When the received input is not a revision request for extracting revision history data with a version number within a user-specified range, the extracting means (203) responds by ending the process for extracting revision history data with a version number within the user-specified range (Block 837).

In Block 834, when the received input is a revision request for extracting revision history data with a version number within a user-specified range, the extracting means (203) responds by extracting the revision history data with a version number within the user-specified range from the first, second or third revision history data list targeted by the revision request. In Block 835, the display control means (204) creates in the storage means (206) a list (referred to as the "fourth list" below) of the extracted revision history data (referred to as the "fifth revision history data" below) (213). Alternatively, the display control means (204) displays on the display device (205) the fourth list of the fifth revision history data (213). See, for example, revision history data list (321) and revision history data list (322) in FIG. 3C, revision history data list (351) and revision history data list (352) in FIG. 3F, and revision history data list (361) and revision history data list (362) in FIG. 3G. In Block 836, the display control means (204) displays on the display device (205) the source code or information associated with the source code corresponding to at least two revision history data sets in the fourth list. In Block 837, the computer (101) ends the process of extracting revision history data with a version number in the user-specified range.

Figure 9A:
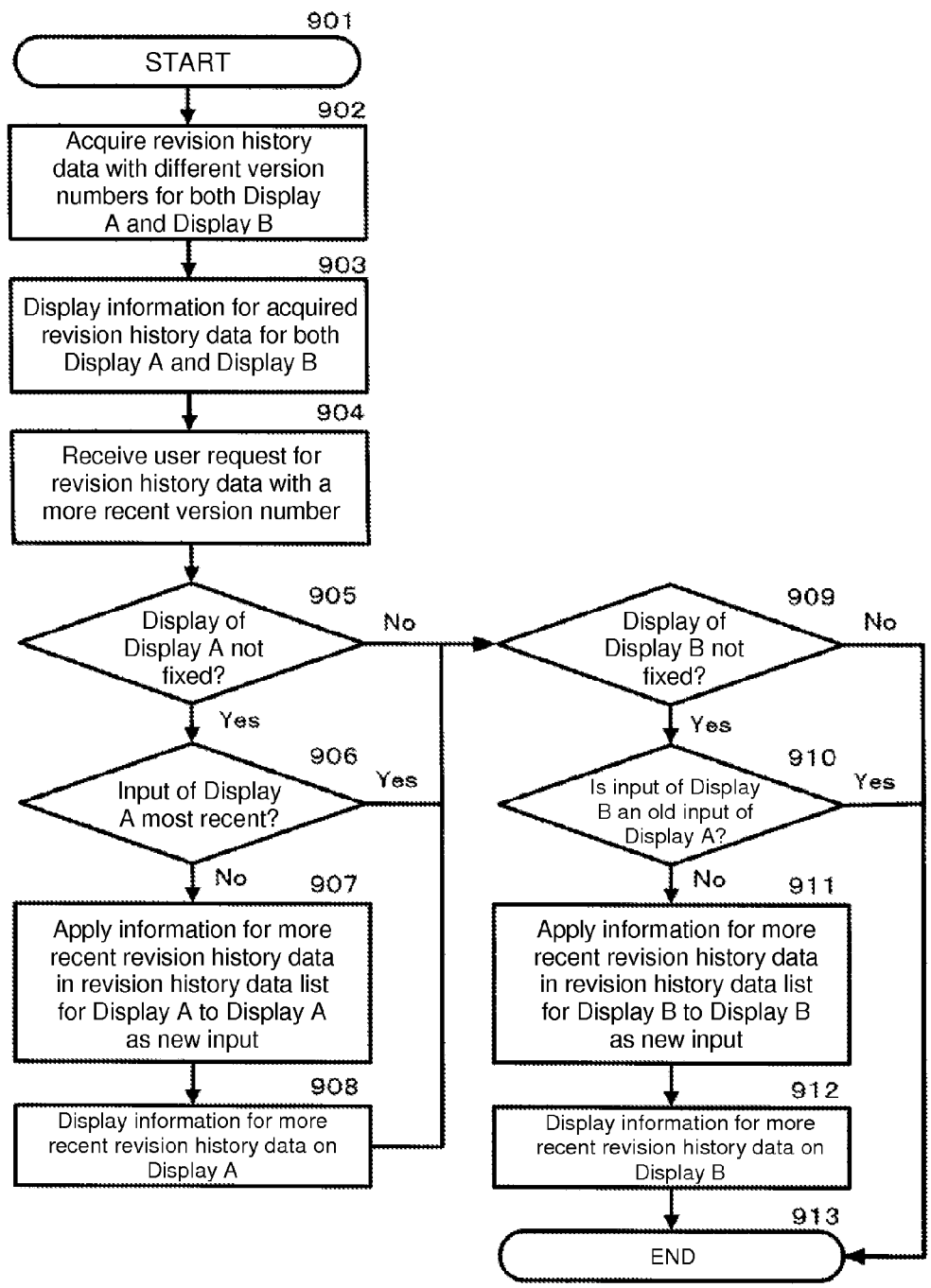
FIG. 9A is a flowchart of the process for the forward display of source code corresponding to the revision history data shown in FIG. 6A through FIG. 6C in accordance with the version number of the revision history data.
Figure 9B:
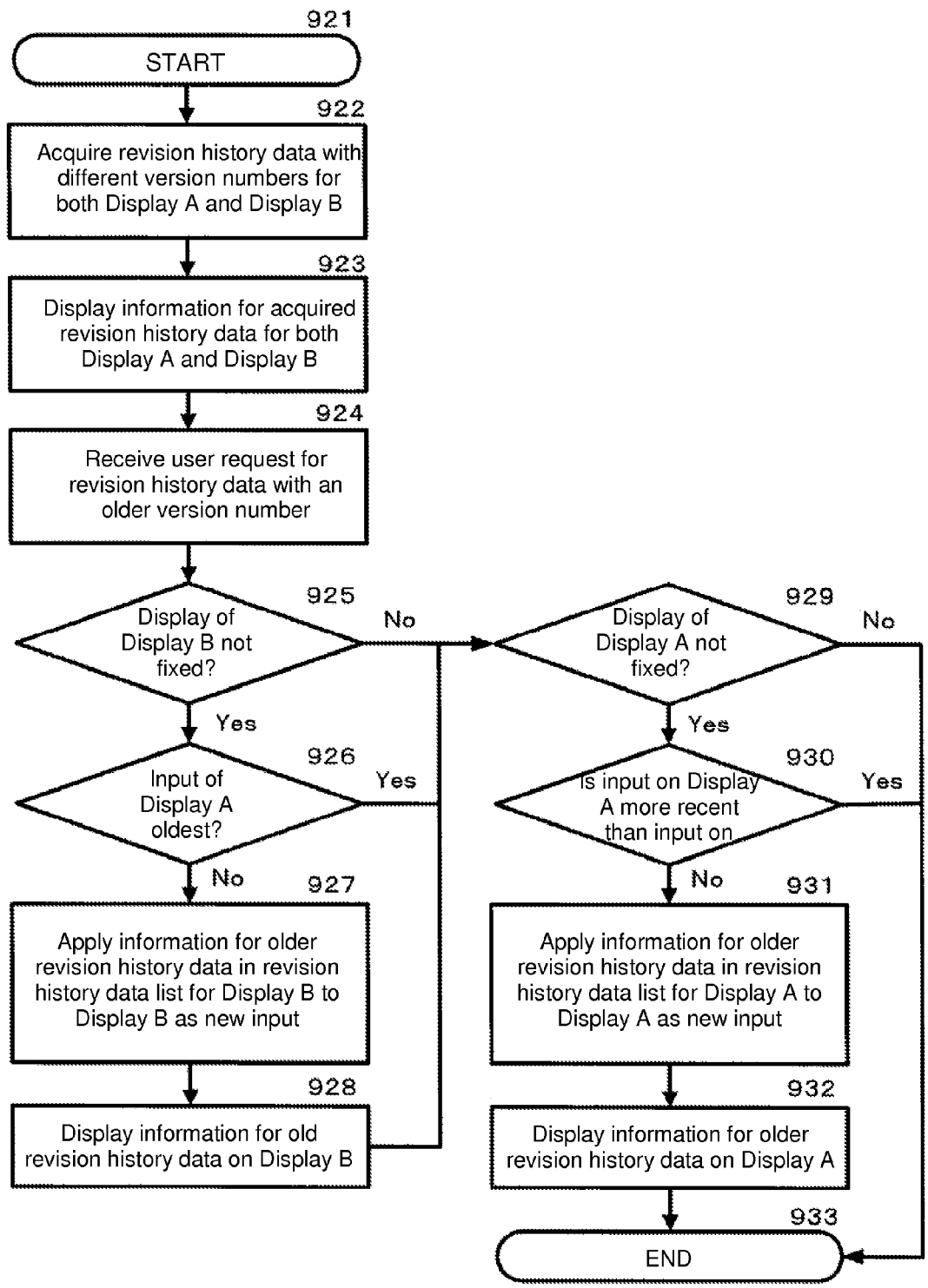
FIG. 9B is a flowchart of the process for the reverse display of source code corresponding to the revision history data shown in FIG. 6A through FIG. 6C in accordance with the version number of the revision history data.

The following is an explanation with reference to the flowcharts in FIG. 9A and FIG. 9B of the "forward" or "reverse" display according to version number of source code corresponding to the revision history data shown in FIG. 6A through FIG. 6C.

FIG. 9A is a flowchart of the process for the forward display (referred to below as the "forward display process" below) of source code corresponding to the revision history data shown in FIG. 6A through FIG. 6C in accordance with the version number of the revision history data. The following is an explanation of the forward display process with reference to window (401) shown in FIG. 4A as well as Display A (402) and Display B (403) included in window (401). For convenience, Display A (402) displays source code corresponding to revision history data with a more recent version number than the source code displayed in Display B (403). Also, in FIG. 4A, Display A (402) is displayed on the left side of the window (401), and Display B (403) is displayed on the right side of the window (401). However, Display A (402) may be displayed on the right side, and Display B (403) may be displayed on the left side.

In Block 901, the display control means (204) starts the forward display process.

In Block 902, the display control means (204) acquires revision history data with difference version numbers in order to display on the display device (205) source code or information associated with source code corresponding to the revision history data with different version numbers on Display A (402) and Display B (403) in the window (401). (In FIG. 9A, source code and information associated with source code are included in the term "information corresponding to the revision history data".)

In Block 903, the display control means (204) displays on Display A (402) and Display B (403) source code or information associated with source code corresponding to the acquired revision history data. In Block 904, the display control means (204) receives signals when button (421) among the four buttons (411) is left-clicked. In other words, the display control means (204) receives a request to display on Display A (402) and Display B (403) revision history data with a version number one version more recent than the revision history data associated with the source code currently displayed on Display A (402) and Display B (403).

In Block 905, the display control means (204) determines whether or not the pin (431) allows the user to change revision history data selected for Display A (402) to revision history data with another version number. (In other words, it determines whether or not the display of the source code on Display A (402) is fixed.) When the display of the source code on Display A (402) has been fixed (see icon (452) for pin (431) in FIG. 4A), the display control means (204) responds by advancing the process to Block 906. When the display of the source code on Display A (402) has not been fixed (see icon (451) for pin (431) in FIG. 4A), the display control means (204) responds by advancing the process to Block 909.

In Block 906, the display control means (204) determines whether or not the revision history data corresponding to the source code currently displayed on Display A (402) is the most recent revision history data in the revision history data list. When the revision history data is not the most recent revision history data, the display control means (204) responds by advancing the process to Block 907. When the revision history data corresponding to the source code currently displayed on Display A (402) is the most recent revision history data, the display control means (204) responds by advancing the process to Block 909 and then continues the process for Display B (403) (Blocks 909-912). Because the revision history data corresponding to the source code currently displayed on Display A (402) is the most recent revision history data, there is no revision history data with a more recent version number than the most recent revision history data remaining on the revision history data list. In other words, the revision history data corresponding to the currently displayed most recent source code cannot be advanced to revision history data with a more recent version number than that of the most recent revision history data.

In Block 907, in response to the revision history data not being the most recent revision history data, the display control means (204) acquires from the storage means (206) the source code or information associated with the source code corresponding to the revision history data with the version number one version more recent than that of the revision history data corresponding to the source code currently displayed on Display A (402). The acquired source code or information associated with the source code is then displayed on Display A (402). In Block 908, the display control means (204) displays the source code or information associated with the source code acquired in Block 907 on the Display A (402). Next, the display control means (204) continues with the processing (Blocks 909-912) for Display B (403).

In Block 909, the display control means (204) determines whether or not the pin (441) allows the user to change revision history data selected for Display B (403) to revision history data with another version number. (In other words, it determines whether or not the display of the source code on Display B (403) is fixed.) When the display of the source code on Display B (403) has been fixed (see icon (461) for pin (441) in FIG. 4A), the display control means (204) responds by advancing the process to Block 910. When the display of the source code on Display B (403) has not been fixed (see icon (462) for pin (431) in FIG. 4A), the display control means advances the process to Block 913 which is the block at which the process is ended. This is because the display of the source code on Display B (403) is fixed.

In Block 910, the display control means (204) determines whether or not the version number of the revision history data corresponding to the source code currently displayed on Display B (403) is the version number one version older than the version number of the revision history data corresponding to the source code currently displayed on Display A (402). When the version number is not one older, the display control means (204) responds by advancing the process to Block 911. When the version number is one older, the display control means (204) advances the process to Block 913 which is the block at which the process ends. This is because the version number of the revision history data corresponding to the source code currently displayed on the Display B (403) is already one version number older than the version number of the revision history data corresponding to the source code display on Display A (402).

In Block 911, in response to the revision history data not being the next oldest revision history data, the display control means (204) acquires from the storage means (206) the source code or information associated with the source code corresponding to the revision history data with the version number one version older than that of the revision history data corresponding to the source code currently displayed on Display B (403). The acquired source code or information associated with source code is then displayed on Display B (403). In Block 912, the display control means (204) displays in Display B (403) the source code or information associated with the source code acquired in Block 911. In Block 913, the display control means (204) ends the forward display process.

FIG. 9B is a flowchart of the process for the reverse display (referred to below as the "reverse display process" below) of source code corresponding to the revision history data shown in FIG. 6A through FIG. 6C in accordance with the version number of the revision history data. The following is an explanation of the forward display process with reference to window (401) shown in FIG. 4A as well as Display A (402) and Display B (403) included in window (401). For convenience, Display A (402) displays source code corresponding to revision history data with a more recent version number than the source code displayed in Display B (403). Also, in FIG. 4A, Display A (402) is displayed on the left side of the window (401), and Display B (403) is displayed on the right side of the window (401). However, Display A (402) may be displayed on the right side, and Display B (403) may be displayed on the left side.

In Block 921, the display control means (204) starts the reverse display process. In Block 922, the display control means (204) acquires revision history data with difference version numbers in order to display on the display device (205) source code or information associated with source code corresponding to the revision history data with different version numbers on Display A (402) and Display B (403) in the window (401). (In FIG. 9B, source code and information associated with source code are included in the term "information corresponding to the revision history data".) In Block 923, the display control means (204) displays on Display A (402) and Display B (403) source code or information associated with source code corresponding to the acquired revision history data. In Block 924, the display control means (204) receives signals when button (423) among the four buttons (411) is left-clicked. In other words, the display control means (204) receives a request to display on Display A (402) and Display B (403) revision history data with a version number one version older than the revision history data associated with the source code currently displayed on Display A (402) and Display B (403).

In Block 925, the display control means (204) determines whether or not the pin (431) allows the user to change revision history data selected for Display B (403) to revision history data with another version number. (In other words, it determines whether or not the display of the source code on Display B (403) is fixed.) When the display of the source code on Display B (403) has been fixed (see icon (461) for pin (441) in FIG. 4A), the display control means (204) responds by advancing the process to Block 926. When the display of the source code on Display B (403) has not been fixed (see icon (462) for pin (441) in FIG. 4A), the display control means (204) responds by advancing the process to Block 929.

In Block 926, the display control means (204) determines whether or not the revision history data corresponding to the source code currently displayed on Display B (403) is the oldest revision history data in the revision history data list. When the revision history data is not the oldest revision history data, the display control means (204) responds by advancing the process to Block 927. When the revision history data corresponding to the source code currently displayed on Display B (403) is the oldest revision history data, the display control means (204) responds by advancing the process to Block 929 and then continues the process for Display B (403) (Blocks 929-932). Because the revision history data corresponding to the source code currently displayed on Display B (403) is the oldest revision history data, there is no revision history data with an older version number than the oldest revision history data remaining on the revision history data list. In other words, the revision history data corresponding to the currently displayed oldest source code cannot be advanced to revision history data with an older version number than that of the oldest revision history data.

In Block 927, in response to the revision history data not being the most recent revision history data, the display control means (204) acquires from the storage means (206) the source code or information associated with the source code corresponding to the revision history data with the version number one version more recent than that of the revision history data corresponding to the source code currently displayed on Display B (403). The acquired source code or information associated with source code is then displayed on Display B (403). In Block 928, the display control means (204) displays the source code or information associated with the source code acquired in Block 927 on the Display B (403). Next, the display control means (204) continues with the processing (Blocks 929-932) for Display A (402).

In Block 929, the display control means (204) determines whether or not the pin (431) allows the user to change revision history data selected for Display A (402) to revision history data with another version number. (In other words, it determines whether or not the display of the source code on Display A (402) is fixed.) When the display of the source code on Display A (402) has been fixed (see icon (451) for pin (431) in FIG. 4A), the display control means (204) responds by advancing the process to Block 930. When the display of the source code on Display B (403) has not been fixed (see icon (452) for pin (431) in FIG. 4A), the display control means (204) responds by advancing the process to Block 933 which is the block at which the process is ended. This is because the display of the source code on Display A (402) is fixed.

In Block 930, the display control means (204) determines whether or not the version number of the revision history data corresponding to the source code currently displayed on Display A (402) is the version number one version more recent than the version number of the revision history data corresponding to the source code currently displayed on Display B (403). When the version number is not the one more recent, the display control means (204) responds by advancing the process to Block 931. When the version number is the one more recent, the display control means (204) advances the process to Block 913 which is the block at which the process ends. This is because the version number of the revision history data corresponding to the source code currently displayed on the Display A (402) is already one version number more recent than the version number of the revision history data corresponding to the source code display on Display B (403).

In Block 931, in response to the revision history data not being the next more recent revision history data, the display control means (204) acquires from the storage means (206) the source code or information associated with the source code corresponding to the revision history data with the version number one version more recent than that of the revision history data corresponding to the source code currently displayed on Display A (402). The acquired source code or information associated with source code is then displayed on Display A (402). In Block 932, the display control means (204) displays in Display A (402) the source code or information associated with the source code acquired in Block 931. In Block 933, the display control means (204) ends the reverse display process.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for retrieving a change in source code from a plurality of revision history data sets including link information to the source code and version information, the method comprising:
   extracting a first revision history data from the plurality of revision history data sets, wherein the first revision history data includes a creation date of the revision history data, a reviser of the source code, and a comment provided by the reviser of the source code,
   creating a first list of the first revision history data, wherein the first list consists of revision history data from the plurality of revision history data sets that includes a first function unit specified by a user, wherein the first function unit is a variable, function, macro definition, method, subroutine, or tag structure for a structured document; and
   displaying on a display device the first list of the first revision history data.

2. The method of claim 1, wherein displaying the first list further comprises displaying on the display device the source code or information associated with the source code corresponding to at least two different change code data sets in the first list.

3. A computer implemented method for retrieving a change in source code from a plurality of revision history data sets including link information to the source code and version information, the method comprising:
   extracting a first revision history data from the plurality of revision history data sets, wherein the revision history data includes a creation date of the revision history data, a reviser of the source code, and a comment provided by the reviser of the source code;
   creating in a storage area a first list of the first revision history data, wherein the first list consists of revision history data from the plurality of revision history data sets that includes a first function unit specified by a user, wherein the first function unit is a variable, function, macro definition, method, subroutine, or tag structure for a structured document; and
   displaying on a display device the source code or information associated with the source code corresponding to at least two different change code data sets in the first list.

4. The method of claim 3, wherein displaying on the display device the source code or information associated with the source code corresponding to at least two different change code data sets in the first list further comprises:
   enabling the fixing of display of the source code or information associated with the source code corresponding to one or more revision history data sets on the display device, and the display of the remaining revision history data on the display device in order according to the version information or the creation date of the revision history data; or
   enabling the display of the source code or information associated with the source code corresponding to one or more revision history data sets and the remaining revision history data on the display device in order according to the version information or the creation date of the revision history data.

5. The method of claim 3, further comprising:
   extracting revision history data including a second function unit other than the first function unit from the first revision history data in response to a user specifying the second function unit, and displaying on the display device a second list of the second revision history data; or
   extracting revision history data including the second function unit from a plurality of the revision history data sets, combining the third revision history with the first revision history data, and displaying on the display device a third list of the combined revision history data.

6. The method of claim 5, wherein displaying the second list further comprises displaying on the display device the source code or information associated with the source code corresponding to at least two different revision history data sets in the second list, or displaying the third list further comprises a block of displaying on the display device the source code or information associated with the source code corresponding to at least two different revision history data sets in the third list.

7. The method of claim 4, the method further comprising:
   extracting revision history data including a second function unit other than the first function unit from the first revision history data in response to a user specifying the second function unit, creating in a storage area a second list of the second revision history data, and displaying on the display device the source code or information associated with the source code corresponding to at least two different revision history data sets in the second list; or
   extracting revision history data including the second function unit from a plurality of the revision history data sets, combining the third revision history data with the first revision history data, creating in a storage region a third list of the combined revision history data, and displaying on the display device the source code or information associated with the source code corresponding to at least two different revision history data sets in the third list.

8. The method of claim 7, wherein displaying on the display device the source code or information associated with the source code corresponding to at least two different change code data sets in the second list, or displaying on the display device the source code or information associated with the source code corresponding to at least two different change code data sets in the third list further comprise:
- enabling the fixing of display of the source code or information associated with the source code corresponding to one or more revision history data sets on the display device, and the display of the remaining revision history data on the display device in order according to the version information or the creation date of the revision history data; or
- enabling the display of the source code or information associated with the source code corresponding to one or more revision history data sets and the remaining revision history data on the display device in order according to the version information or the creation date of the revision history data.

9. The method of claim 5, wherein specification of the second function unit by the user is specification of the second function unit being the first function unit by a different name, and wherein displaying the third list on the display device is executed in accordance with the specification of the second function unit being the first function unit by a different name.

10. The method of claim 7, wherein specification of the second function unit by the user is specification of the second function unit being the first function unit by a different name, and wherein displaying on the display device the source code or information associated with the source code corresponding to at least two different revision history data sets in the third list is executed in accordance with the specification of the second function unit being the first function unit by a different name.

11. The method of claim 5, the method further comprising: executing at least two blocks of displaying the second list and at least two blocks of displaying the third list; or executing at least one block of displaying the second list and at least one block of displaying the third list.

12. The method of claim 7, the method further comprising:
- combining and executing at least two same or different blocks selected from among displaying the source code corresponding to at least two revision history data sets in the second list; displaying information associated with the source code corresponding to at least two revision history data sets in the second list; displaying the source code corresponding to at least two different revision history data sets in the third list; and displaying information associated with the source code corresponding to at least two revision history data sets in the third list.

13. The method of claim 12, the method further comprising: receiving a range of version information for the revision history data specified by the user.

14. A computer system for retrieving a change in source code from a plurality of revision history data sets including link information to the source code and version information, the computer comprising:
- an processor configured to extract a first revision history data from a plurality of revision history data, wherein the first revision history data includes a creation date of the revision history data, a reviser of the source code, and a comment provided by the reviser of the source code,
- creating a first list of the first revision history data, wherein the first list consists of revision history data from the plurality of revision history data sets that includes a first function unit specified by a user, wherein the first function unit is a variable, function, macro definition, method, subroutine, or tag structure for a structured document; and
- a display device configured to display the first list of first revision history data.

15. The computer system of claim 14, wherein the display device is configured to display the source code or information associated with the source code corresponding to at least two different revision history data sets in the first list.

16. A computer system for retrieving a change in source code from a plurality of revision history data sets including link information to the source code and version information, the computer comprising:
- a processor configured to:
  - extract a first revision history data from a plurality of revision history data, wherein the revision history data includes a creation date of the revision history data, a reviser of the source code, and a comment provided by the reviser of the source code; and
  - create a first list of the first revision history data, wherein the first list consists of revision history data from the plurality of revision history data sets that includes a first function unit specified by a user, wherein the first function unit is a variable, function, macro definition, method, subroutine, or tag structure for a structured document;
- a memory configured to store the first list of the first revision history data; and
- a display device configured to display the source code or information associated with the source code corresponding to at least two different revision history data sets in the first list.

17. The computer system of claim 16, wherein the display device is configured to display the source code or information associated with the source code corresponding to at least two different revision history data sets in the first list.

* * * * *